United States Patent
Cialdi et al.

(10) Patent No.: US 12,241,733 B2
(45) Date of Patent: Mar. 4, 2025

(54) DEVICE AND METHOD FOR THE MEASUREMENT OF INCLINATION AND ANGULAR STABILITY OF ELECTROMAGNETIC RADIATION BEAMS, AND FOR THE MEASUREMENT OF A SPATIAL SHIFT OF A FOCUSED ELECTROMAGNETIC RADIATION BEAM

(71) Applicants: UNIVERSITA' DEGLI STUDI DI MILANO, Milan (IT); CENTRE NATIONAL DE LA RECHERCHE SCIENTIFIQUE, Paris (FR); ECOLE POLYTECHNIQUE, Palaiseau (FR)

(72) Inventors: Simone Cialdi, Monza e Brianza (IT); Daniele Ernesto Cipriani, Milan (IT); Stefano Capra, Varese (IT); François Mathieu, Draveil (FR); Zeudi Mazzotta, Breukelen (NL)

(73) Assignee: ECOLE POLYTECHNIQUE, Palaiseau (FR)

( * ) Notice: Subject to any disclaimer, the term of this patent is extended or adjusted under 35 U.S.C. 154(b) by 484 days.

(21) Appl. No.: 17/775,181

(22) PCT Filed: Nov. 5, 2020

(86) PCT No.: PCT/IB2020/060419
§ 371 (c)(1),
(2) Date: May 6, 2022

(87) PCT Pub. No.: WO2021/090230
PCT Pub. Date: May 14, 2021

(65) Prior Publication Data
US 2022/0390225 A1 Dec. 8, 2022

(30) Foreign Application Priority Data
Nov. 7, 2019 (IT) .................. 102019000020562

(51) Int. Cl.
*G01B 11/27* (2006.01)
(52) U.S. Cl.
CPC .................... *G01B 11/27* (2013.01)
(58) Field of Classification Search
CPC ........................................ G01B 11/27
(Continued)

(56) References Cited

U.S. PATENT DOCUMENTS 5,084,980 A * 2/1992 Skopec .................. G01B 11/27
33/286
5,393,973 A * 2/1995 Blau ........................ G01V 8/20
250/221

(Continued)

FOREIGN PATENT DOCUMENTS

EP 2 733 459 A1 5/2014
WO 01/88464 A2 11/2001

OTHER PUBLICATIONS

International Search Report and Written Opinion of the International Searching Authority for International Patent Application No. PCT/IB2020/060419 mailed Feb. 15, 2021, 9 pages.

*Primary Examiner* — George B Bennett
(74) *Attorney, Agent, or Firm* — Merchant & Gould P.C.

(57) ABSTRACT

A device for measuring an angular inclination and angular inclination fluctuations of an electromagnetic radiation beam is adapted to detect the incidence angular inclination and the relative fluctuations with respect to a nominal axis of propagation of the beam, in a desired detection plane including the nominal propagation axis. A system and a method for measuring an angular inclination and angular inclination fluctuations of an electromagnetic radiation beam uses the device for measuring an angular inclination and angular inclination fluctuations of an electromagnetic radiation beam. A method measures a spatial shift of a (Continued)

focused laser beam, at the focusing point, with respect to a reference optical axis.

20 Claims, 19 Drawing Sheets

(58) Field of Classification Search
USPC .......................................................... 33/286
See application file for complete search history.

(56) References Cited

U.S. PATENT DOCUMENTS

| | | | |
|---|---|---|---|
| 5,519,489 A * | 5/1996 | McClenahan | G01B 11/2755 |
| | | | 356/139.09 |
| 6,891,148 B1 * | 5/2005 | Rivera | G01C 11/00 |
| | | | 250/221 |
| 6,964,106 B2 * | 11/2005 | Sergyeyenko | G01C 15/004 |
| | | | 33/291 |
| 7,508,512 B1 | 3/2009 | Rollins et al. | |
| 7,652,759 B1 * | 1/2010 | Dogul | F16P 3/144 |
| | | | 356/218 |
| 9,605,951 B2 * | 3/2017 | Holzl | G01B 11/272 |
| 10,409,084 B2 * | 9/2019 | New | G02B 27/4272 |
| 2002/0126388 A1 * | 9/2002 | Schaller | G01B 11/27 |
| | | | 359/627 |
| 2019/0160553 A1 * | 5/2019 | Pertschi | B23B 35/00 |

\* cited by examiner

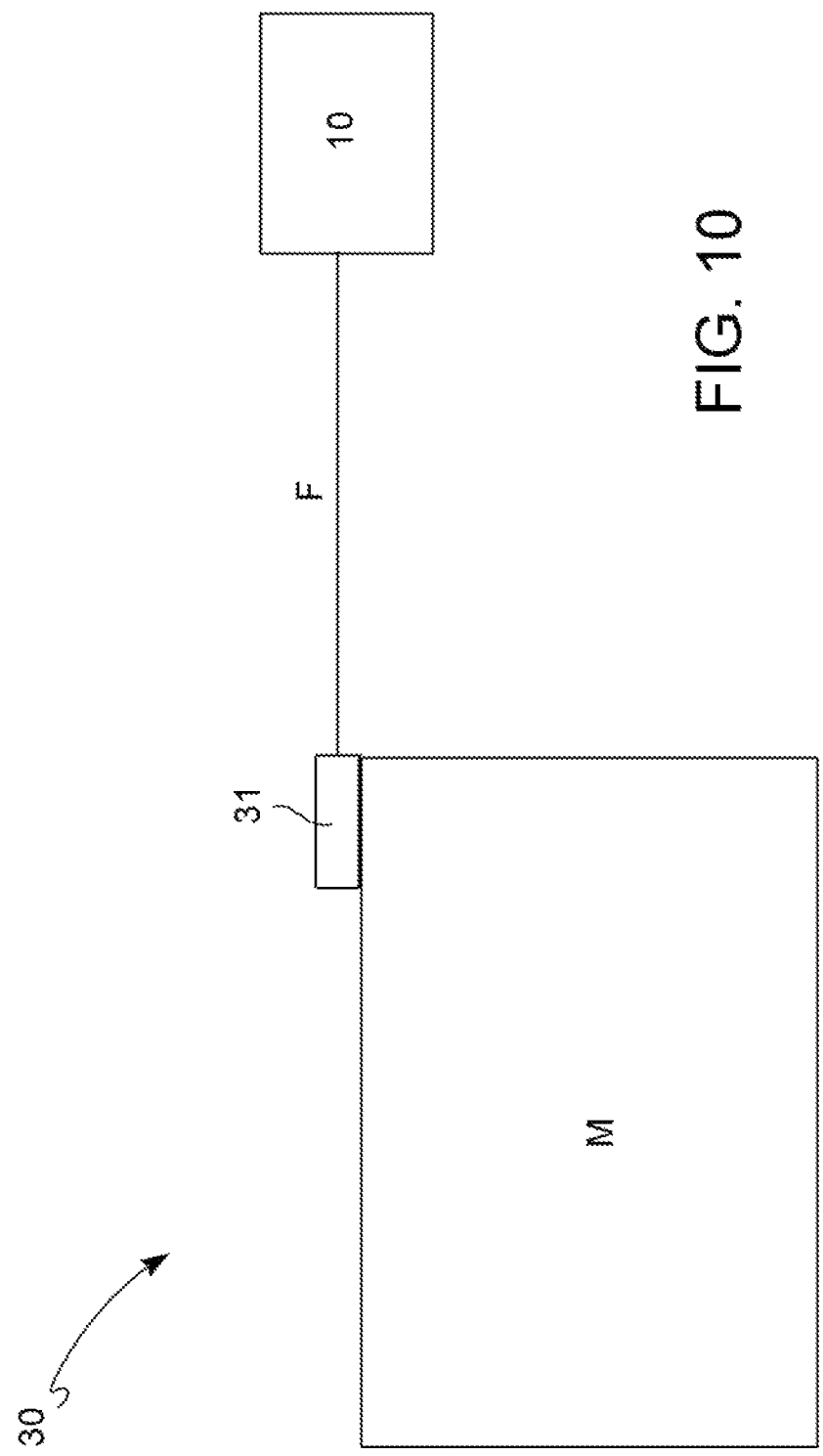

DEVICE AND METHOD FOR THE MEASUREMENT OF INCLINATION AND ANGULAR STABILITY OF ELECTROMAGNETIC RADIATION BEAMS, AND FOR THE MEASUREMENT OF A SPATIAL SHIFT OF A FOCUSED ELECTROMAGNETIC RADIATION BEAM

This application is a National Stage Application of PCT/IB2020/060419, filed 5 Nov. 2020, which claims benefit of Ser. No. 10/201,9000020562, filed 7 Nov. 2019 in Italy, and which applications are incorporated herein by reference. To the extent appropriate, a claim of priority is made to each of the above-disclosed applications.

FIELD OF APPLICATION

The present invention relates to the technical field of the measurement of inclination and angular stability of beams of electromagnetic radiation.

In particular, the invention refers to a device and a method for measuring an angular inclination, and related fluctuations, of a beam of electromagnetic radiation and therefore the angular stability of pointing of the beam.

The invention also relates to a device and a method for measuring a spatial shift of a focused electromagnetic radiation beam, with respect to a reference optical axis.

DESCRIPTION OF THE PRIOR

In the considered technical field, known solutions are based on complex optical instruments, which provide optical focusing means (for example one or more lenses) and a video camera (for example CCD) on which the beam is focused. The camera detects the beam, and in particular a position of beam reception, and the beam pointing stability is determined on the basis of the variations of the reception position A further known solution is based on the so-called "segmented photodiode" technique, which allows to detect a spatial shift of the beam, detecting the different power levels received in the different areas of photodiode detection caused by the beam displacement.

These known solutions suffer from several problems and limitations, including:
  limitations of the frequencies of detectable angular inclination fluctuations; typically the maximum frequencies detectable by the known solutions do not exceed the few tens of Hz;
  limits in the minimum resolution of detectable angular inclination: for example, angular resolutions of the order of magnitude of a nano-radiant would be desirable, but cannot be obtained with known solutions;
  measurement precision limits: for example, measurement with better precision than the precision obtainable with known solutions would be desirable.

Moreover, the most common known solutions provide complex and large-scale installations (for example, optical benches for mounting the detection system), while it would be desirable to have devices as simple and compact as possible.

In the considered technical context, there is a strongly felt need to devise methods and devices capable of measuring beam angular inclinations, and related angular fluctuations, at high frequency, with high reliability (with measurement error possibly contained below the 10%) and with a high resolution (ideally, resolving a nano-radiant).

The need is also felt to carry out a high quality measurement, such as the one illustrated above, using devices that are as simple, compact and robust as possible.

A further drawback of the detection carried out by known devices and methods (for example, CCD and segmented photodiode) consists in the fact that such solutions require an adaptation and optimization of the beam size with respect to the size of the detector, before detection, since the obtained measurements depend critically on these parameters. The system for adapting/optimizing the size of the beam depends on the characteristics of the considered beam, making the known devices complex and not very flexible.

The need is therefore felt to devise devices capable of detecting angular fluctuations with great flexibility, that is, ideally, independently of the dimensions of the beam.

SUMMARY OF THE INVENTION

An object of the present invention is to provide a device for measuring an angular inclination, and fluctuations thereof, of a beam of electromagnetic radiation, representative of the pointing stability of this beam, capable of obviating at least partially the drawbacks above indicated with reference to the prior art, and to respond to the aforementioned requirements particularly felt in the technical field considered.

Further embodiments of this device are defined by claims 2-10.

A further object of the present invention is to provide a system for measuring an angular inclination and angular inclination fluctuations of an electromagnetic radiation beam, using the aforementioned device.

A further object of the present invention is to provide a corresponding method for measuring an angular inclination and angular inclination fluctuations of an electromagnetic radiation beam, and therefore of the angular pointing stability of this beam.

Further purposes of the present invention are to provide a system and a corresponding method, using the aforementioned device, to determine the stability and/or the vibration state of a mechanical structure.

A further object of the present invention is to provide a method for measuring a spatial shift of a focused laser beam, in the focalization point, based on the aforesaid method for measuring an angular inclination and angular inclination fluctuations of an electromagnetic radiation beam, and employing the aforesaid device for measuring an angular inclination.

BRIEF DESCRIPTION OF THE DRAWINGS

Further characteristics and advantages of the device and of the method for measuring an angular inclination and angular inclination fluctuations of an electromagnetic radiation beam, and of the device and system to determine the stability and/or vibration state of a mechanical structure, and of the method for measuring a spatial shift of a focused laser beam, according to the present invention, will appear from the following description of preferred embodiments, given by way of non-limiting example, with reference to the attached figures, in which:

FIG. 10 illustrates an embodiment of a system for determining stability and/or vibration state of a mechanical structure, comprised in the invention;

DETAILED DESCRIPTION

Figure 1:
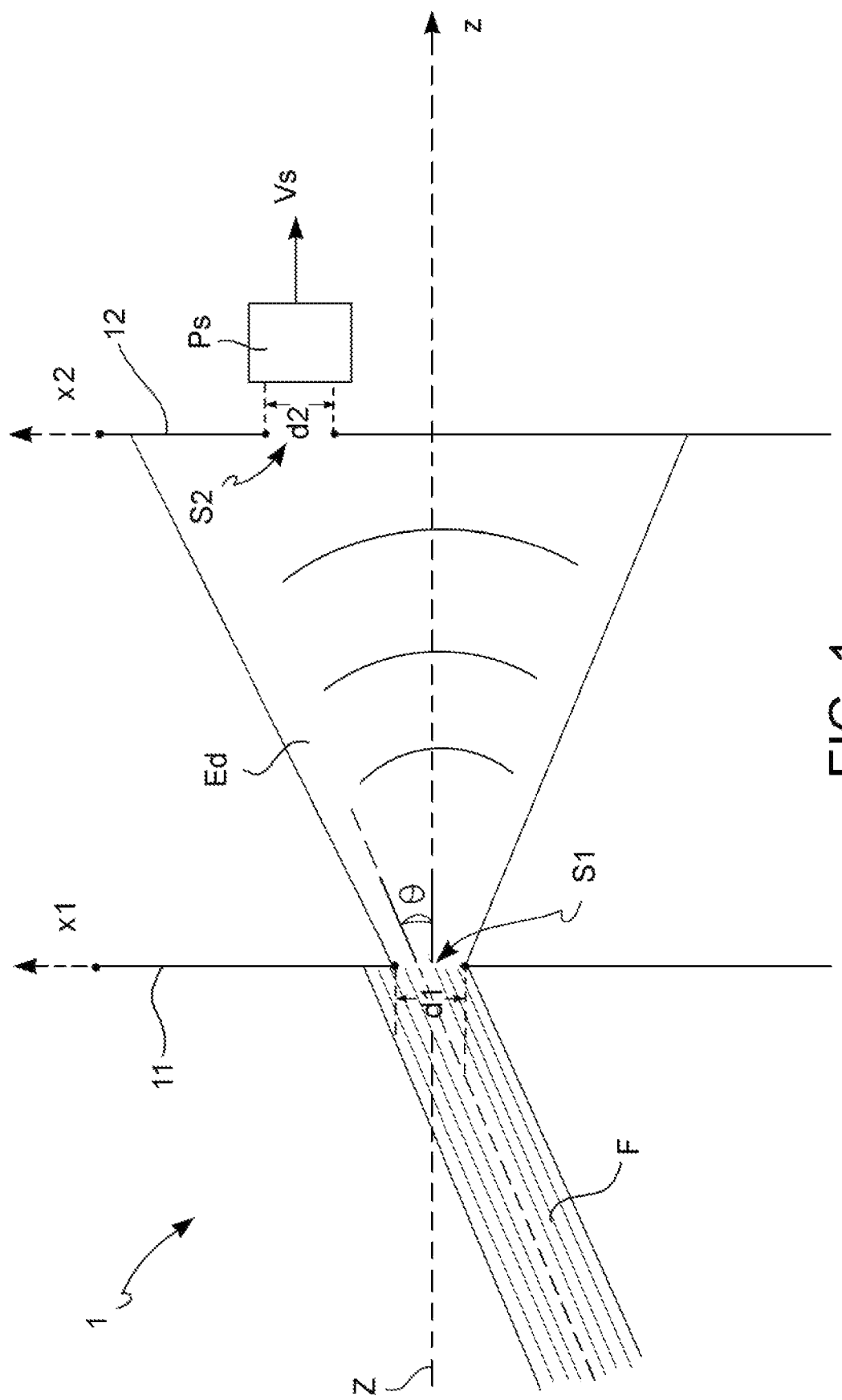
FIG. 1 illustrates, by means of a simplified diagram, an embodiment of a device for measuring an angular inclination and angular inclination fluctuations of a beam, according to the present invention.
Figure 2:
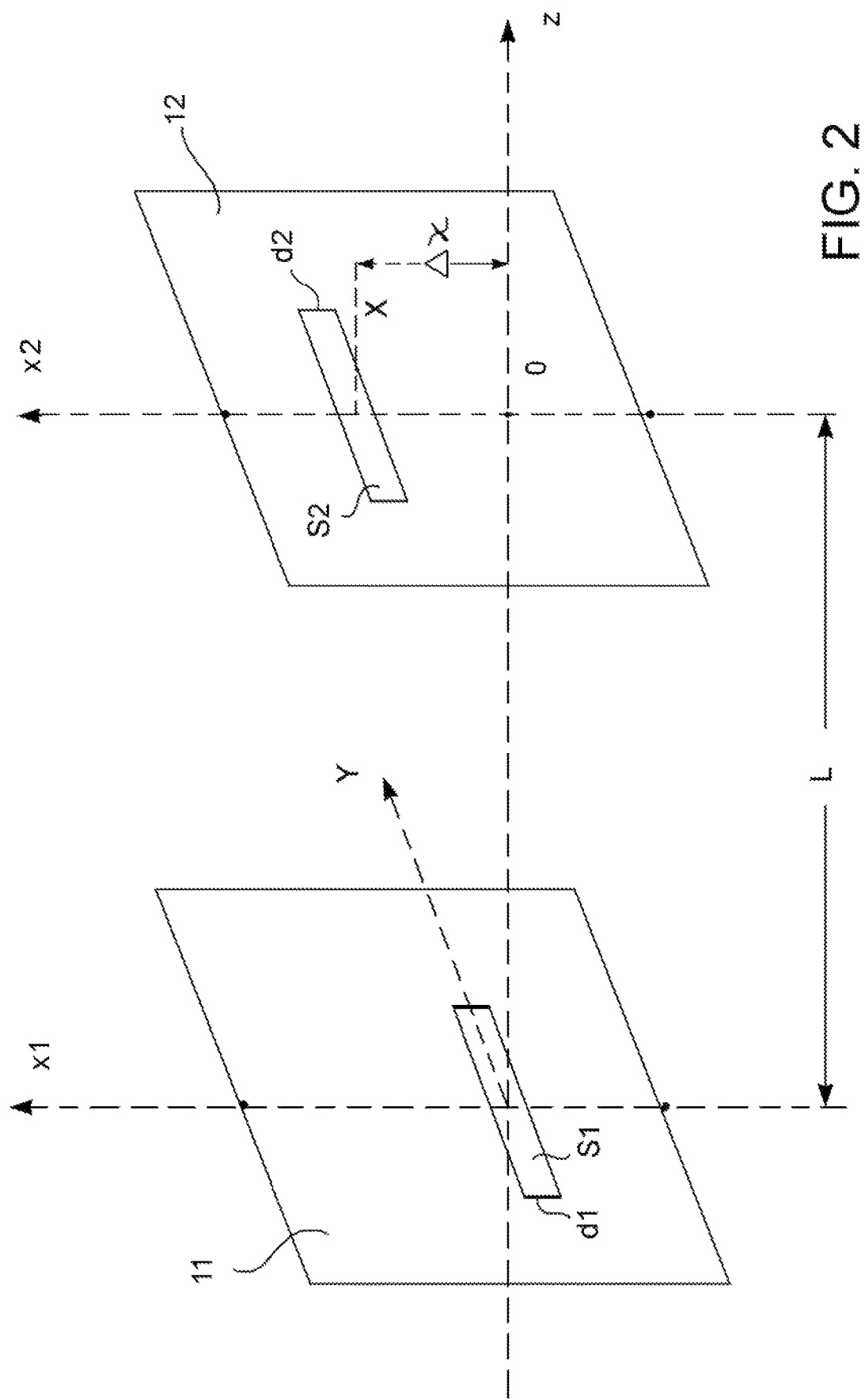
FIG. 2 represents a prospective view of a portion of the device of FIG. 1.
Figure 3:
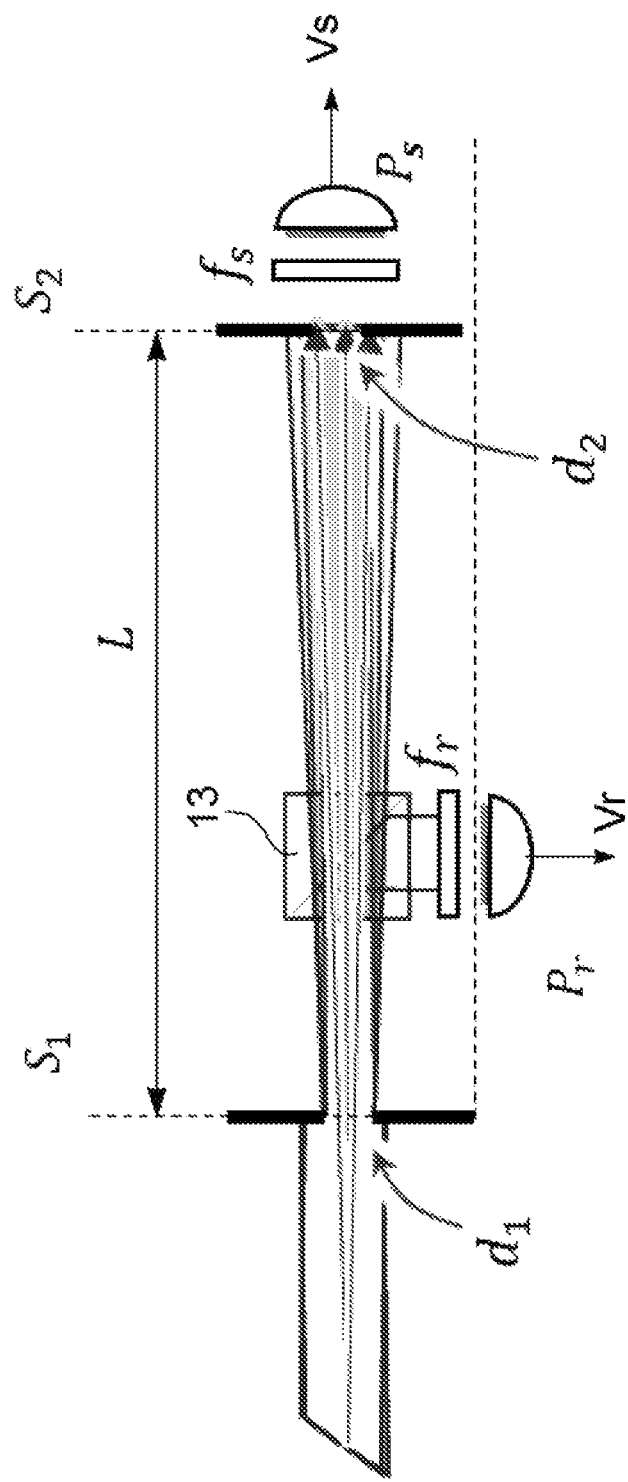
FIG. 3 represents a diagram of another embodiment of a device for measuring an angular inclination and angular inclination fluctuations of a beam according to the present invention.

With reference to FIGS. 1-18, and in particular to FIGS. 1, 2 and 3, a device 1 is now described for measuring an angular inclination and of angular inclination fluctuations of an electromagnetic radiation beam F.

This device is adapted to detect the incidence angular inclination and the fluctuations Δθ of the incidence angular inclination with respect to a nominal axis of propagation of the beam, in a desired detection plane comprising the nominal propagation axis.

The device 1 comprises a first screen 11, a second screen 12 and at least one first electromagnetic power and/or energy detector Ps.

The first screen 11 comprises a first slit S1 having a first slit dimension d1 along a first direction x1 on a detection plane transverse to the first slit. The first slit S1 is adapted to determine, when crossed by the beam, a diffraction of the beam, so as to generate downstream of the first screen 11 a diffracted electromagnetic field Ed having on the detection plane a diffraction pattern dependent on the aforementioned incidence angular inclination θ of the beam.

The second screen 12 comprises a second slit S2 having a second slit dimension d2 along a second direction x2, parallel to the aforementioned first direction x1 on the detection plane. The second slit S2 is parallel to the first slit S1 in a direction y perpendicular to the aforementioned first and second directions (x1, x2), and is arranged in a selection position (X) on a scale defined on the second direction x2.

The second screen 12 is arranged downstream of the first screen, with respect to the propagation of the beam, and is configured to shield the diffracted electromagnetic field with the exception of a transmitted portion of diffracted electromagnetic field, passing through the second slit S2.

The at least one first electromagnetic power and/or energy detector Ps is arranged downstream of the second slit S2, with respect to the propagation of the beam, and is configured to detect the electromagnetic power and/or energy of the transmitted portion of diffracted electromagnetic field, dependent from the diffraction figure.

Such at least one first electromagnetic power and/or energy detector Ps is configured to generate a first electrical signal Vs, based on the detected electromagnetic power and/or energy.

Since the electromagnetic power and/or energy detected by the first detector depends on the geometry, or the diffraction figure, of the diffracted electromagnetic field Ed, which in turn depends on the incidence angular inclination θ of the beam in the detection plane, the aforesaid first electrical signal Vs is representative of the incidence angular inclination θ of the beam in the detection plane.

Moreover, since the variations in time of the incidence angular inclination θ of the beam determine immediate consequent variations of the diffraction pattern of the diffracted electromagnetic field Ed, which in turn cause corresponding immediate variations in the electromagnetic power and/or energy detected by the first detector, the evolution in time of the incidence angular inclination is representative of the angular inclination fluctuations Δθ of the electromagnetic radiation beam, with respect to the nominal propagation axis Z of the beam, in the desired detection plane.

According to an embodiment of the device, the aforesaid selection position X of the second slit S2 is displaced by a shift distance of Δx, along the second direction x2 (as illustrated in FIG. 2), with respect to an alignment position (0) of the second slit with the first slit defined with respect to the nominal propagation axis of the beam.

In accordance with an implementation option, the aforementioned first screen 11 and second screen 12 are parallel to each other and arranged at a distance between screens L, along a direction z parallel to the nominal beam propagation axis. In this case, the shift distance (Δx) is defined in dependence on the aforementioned first slit dimension d1 and the aforementioned distance between screens L, so that the predefined power and/or energy curve of the diffraction figure of the diffracted electromagnetic field Ed, as a function of the second direction x2, in conditions of incident beam aligned to the nominal propagation axis, has a maximum value of derivative, and therefore a maximum value of sensitivity to the displacement of the diffraction pattern as a consequence of a variation of the incidence angular inclination.

According to an embodiment of the device, the aforementioned first slit dimension d1 is defined on the basis of the wavelength $\lambda$ of the incident beam so that the incident beam is spatially coherent in the window defined by said slit dimension d1 along the first direction x1.

According to a preferred embodiment, the device 1 further comprises a beam splitter 13 and a second electromagnetic power and/or energy detector Pr.

The beam splitter 13 is arranged downstream of the first screen 11, and is configured to divide the electromagnetic radiation beam into a first beam portion, which continues towards the second screen, and a second beam portion, which is deflected into a different direction.

The second electromagnetic power and/or energy detector Pr is arranged to receive the second deflected beam portion, and is configured to detect the electromagnetic power and/or energy of the second deflected beam portion.

The second electromagnetic power and/or energy detector Pr is further configured to generate a second electrical signal Vr, based on the detected electromagnetic power and/or energy. The second electrical signal Vr is representative of the power and/or energy of the incident electromagnetic radiation beam.

As will be better explained below, the second beam portion is a sort of reference beam, indicative of the power and/or energy of the incident beam, and the second electrical signal Vr is a reference signal, which can be used to render the measurement of the angular inclination of the beam independent of any variations in power and/or energy of the incident electromagnetic radiation beam.

In accordance with an application option of use, the device 1 is configured to operate on an electromagnetic radiation beam consisting of a laser beam at a frequency belonging to a detectable infrared frequency range (Near Infra-Red, NIR, or Mid Infra-Red MIR, or Far Infra-Red, FIR), or to a detectable visible or ultraviolet frequency range.

In such a case, the aforementioned first screen 11 and second screen 12 are made of opaque material with respect to the frequencies of the range of detectable laser beam frequencies. Moreover, the first electromagnetic power and/or energy detector Ps comprises a photodiode Ps configured to detect electromagnetic power and/or energy at the frequencies of the range of detectable laser beam frequencies.

Similarly, the possible second electromagnetic power and/or energy detector Pr comprises a photodiode Pr configured to detect electromagnetic power and/or energy at the frequencies of the range of detectable laser beam frequencies.

According to another application option of use, the device 1 is configured to operate on an electromagnetic radiation beam consisting of an X-ray beam, at a frequency belonging to a range of frequencies in the X-ray band.

In this case, the aforementioned first screen 11 and second screen 12 are made of opaque material with respect to the frequencies in the band of detectable X-rays. Moreover, the first electromagnetic power and/or energy detector Ps comprises a photodiode Ps configured to detect power and/or electromagnetic energy at frequencies of the frequency range in the band of detectable X-rays.

Similarly, the possible second electromagnetic power and/or energy detector Pr comprises a photodiode Pr configured to detect electromagnetic power and/or energy at the frequencies of the frequency range in the band of detectable X-rays.

According to other implementation options, the device 1 is configured to operate on an electromagnetic radiation beam at any other frequency/wavelength of the electromagnetic spectrum.

According to one embodiment, the device 1 further comprises first means for controlled screen displacement, configured to move the second screen 12 in a controlled manner with respect to the first screen 11, along the second direction x2, so as to vary the shift distance $\Delta x$ of the second slit in a controllable way.

Such first means for controlled screen displacement comprises, for example, a slide, on which the second screen is mounted, and mechanical means for precision control of the movements of this slide along the second direction x2.

According to another embodiment, the device 1 further comprises second means for controlled screen displacement, configured to move the second screen 12 in a controlled manner with respect to the first screen 11, along the z direction parallel to the nominal beam propagation axis, so as to controllably vary the aforementioned distance between screens L.

Such second means for controlled screen displacement comprises, for example, a slide, on which the second screen is mounted, and mechanical means for precisely controlling the movements of this slide along the z-direction.

According to another embodiment, the device 1 further comprises slit opening control means, configured to vary in a controlled way the first slit dimension d1 of the first slit S1.

These slit opening control means can comprises, for example, precision opening/closing diaphragms, per se known.

According to a possible implementation option (illustrated for example in FIG. 3), the device 1 further comprises a first frequency filter fs, arranged just upstream of the first electromagnetic power and/or energy detector Ps, and configured to filter in frequency, within a predefined range of frequencies, the electromagnetic field incident on the aforementioned first detector.

According to another possible implementation option (also illustrated in FIG. 3), the device 1 further comprises a second frequency filter fr, arranged just upstream of the second electromagnetic power and/or energy detector Pr, and configured to filter in frequency, within a predefined frequency range, the electromagnetic field incident on the aforementioned second detector.

A device embodiment capable of determining fluctuations on two orthogonal detection planes, on which fluctuations which will be defined as "horizontal fluctuations" and "vertical fluctuations" can be measured, will now be described. The differences between this embodiment and those previously illustrated will be indicated here below.

The first opening, on the first screen, has any bi-dimensional shape (for example, circular, or square, or rectangular or triangular shape, or other). The device further comprises, downstream of the first screen and upstream of the second screen, a beam splitter configured to divide the beam into two parts, directing one part towards two further slits.

On the second screen, not one but two different orthogonal slits are obtained, which will be defined here "horizontal slit" and "vertical slit".

The part of the beam directed towards the "horizontal slit" makes it possible to determine the "vertical fluctuations" of the incident beam (in a similar way to that described above for the determination of fluctuations).

The part of the beam directed towards the "vertical slit" makes it possible to determine the "horizontal fluctuations" of the incident beam (in a similar way to that described previously for the determination of fluctuations).

Figure 4:
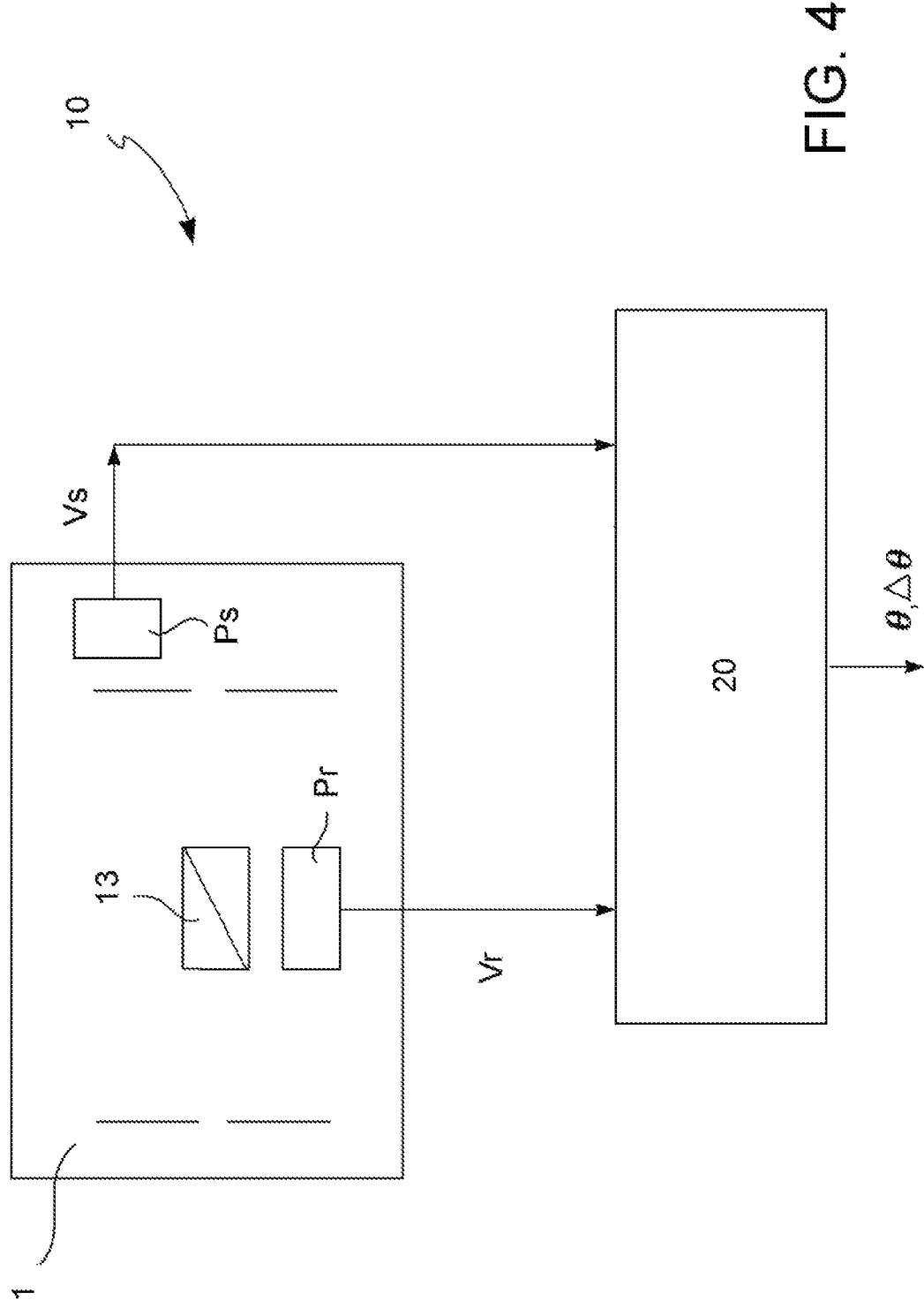
FIG. 4 illustrates, by means of a simplified diagram, an embodiment of a system for measuring an angular inclination and angular inclination fluctuations of a beam, comprising the aforesaid device according to the present invention.

A system 10 for measuring an angular inclination and angular inclination fluctuations of an electromagnetic radiation beam is now described, with reference to the FIGS. 1 and 4.

This system 10 comprises a device 1 for measuring an angular inclination and angular inclination fluctuations of an electromagnetic radiation beam, according to any of the embodiments described above. The system 10 further comprises processing means 20, operatively connected to the device 1 to receive the aforesaid first electrical signal Vs, indicative of the detected electromagnetic power and/or energy, and configured to determine the incidence angular inclination θ of the beam in the plane of detection and/or fluctuations of the incidence angular inclination based on the aforementioned first electrical signal Vs.

According to an embodiment of the system 10, it comprises a device 1 in accordance with the implementation option, illustrated above, which provides for the beam splitter 13 and the second electromagnetic power and/or energy detector Pr, adapted to receive the second beam portion, detecting the electromagnetic power and/or energy of the second beam portion (i.e., the reference electromagnetic power and/or energy) and consequently generating the second electrical reference signal Vr, representative of the power and/or energy of the incident electromagnetic radiation beam.

In this embodiment, the processing means 20 of the system 10 are also operatively connected to the device 1 to also receive this second electrical signal Vr, and are further configured to determine the incidence angular inclination θ of the beam in the detection plane and/or the fluctuations of the incidence angular inclination based on the first electric signal Vs and on the second electric signal Vr, so that the determination of the incidence angular inclination θ is independent of variations in power and/or energy of the incident beam.

In accordance with another embodiment of the system 10, the processing means 20 are further configured to display the time trend of the incidence angular inclination of the beam.

According to a further embodiment of the system 10, the processing means 20 are further configured to calculate the Fourier transform of the fluctuations of the angular inclination Δθ of the beam and to display the frequency spectrum of said fluctuations of the angular inclination Δθ.

A method is now described for measuring an angular inclination θ and angular inclination fluctuations Δθ of an electromagnetic radiation beam F, with respect to a nominal beam propagation axis Z, in a desired detection plane comprising the nominal propagation axis.

This method, first of all, comprises the step of passing the electromagnetic radiation beam F through a first slit S1 of a first screen 11.

This first slit S1 is arranged transversely with respect to the detection plane and has a first slit dimension d1 along a first direction x1 on the aforesaid detection plane, so as to cause a beam diffraction and generate an electromagnetic field Ed downstream of the first screen 11 having on the aforesaid detection plane a diffraction pattern dependent on the incidence angular inclination θ of the beam.

The method then provides the step of arranging, downstream of the first screen with respect to the propagation of the beam, a second screen 12, comprising a second slit S2 having a second slit dimension d2 along a second direction x2 parallel to the first direction x1 on the detection plane.

This step of arranging comprises arranging the second screen 12 so that the second slit S2 is parallel to the first slit S1 in a direction y perpendicular to the aforementioned first and second directions (x1, x2), and placed in a selection position X on a scale defined on the second direction x2.

The method then comprises the step of shielding, by means of the second screen 12, the diffracted electromagnetic field Ed except for a transmitted portion of diffracted electromagnetic field Ed passing through the second slit S2.

The method then provides the steps of detecting the electromagnetic power and/or energy of the transmitted portion of diffracted electromagnetic field Ed, dependent on the diffraction pattern, by at least one first electromagnetic power and/or energy detector Ps, located downstream of the second S2 slit with respect to beam propagation; and to generate, on the basis of the detected electromagnetic power and/or energy, a first electrical signal Vs representative of the incidence angular inclination θ of the beam in the detection plane.

Finally, the method provides for measuring and/or determining the angular inclination θ and the angular inclination fluctuations Δθ of the electromagnetic radiation beam based on the aforementioned first electrical signal Vs.

According to an embodiment of the method, the step of arranging further comprises arranging the second slot S2 in such a way that the aforementioned selection position X of the second slit S2 is shifted by a shift distance Δx, along the second direction x2, with respect to an alignment position (0) of the second slit relative to the first slit S1 defined with respect to the nominal propagation axis Z of the beam.

According to an implementation option, the step of arranging further comprises arranging the aforementioned first screen 11 and second screen 12 parallel to each other and at a distance between screens L along a direction z parallel to the nominal axis of propagation Z of the beam, and arranging the second slit S2 so as to define an optimum shift distance Δx, depending on the aforementioned first slit dimension d1 and on the aforementioned distance between screens L.

The aforementioned optimal shift distance Δx is such that the predefined power and/or energy curve of the diffracted electromagnetic field diffraction pattern, as a function of the second direction x2, in conditions of incident beam aligned with the nominal propagation axis, has a maximum value of derivative, and therefore, advantageously, a maximum value of sensitivity to the diffraction pattern displacement as a consequence of a variation of the incidence angular inclination.

According to an embodiment, the method further comprises defining the first slit dimension d1 on the basis of the wavelength λ of the incident beam, so that the incident beam is spatially coherent in the window defined by this slit dimension d1 along the first direction x1.

In accordance with another particular embodiment of the method, the step of arranging further comprises arranging the first screen 11 and/or the first slit S1, with respect to the source of the electromagnetic beam, in such a way that the spatial offset h of incidence of the beam on the first slit S1, due to an incidence angular inclination, within a range of detectable inclinations, is much less than the radius of curvature R of the incident beam at the first slit S1.

In accordance with a preferred embodiment, the method further comprises the steps of dividing, downstream of the first screen 11, the electromagnetic radiation beam into a first beam portion, which continues towards the second screen 12, and a second beam portion, which is deflected in a different direction; then, receiving said second portion of deflected beam, and detecting the electromagnetic power and/or energy of the second deflected beam portion, by a second electromagnetic power detector and/or energy Pr; finally, generating, based on the detected electromagnetic power and/or energy of the second beam portion, a second electrical signal Vr representative of the power and/or energy of the incident electromagnetic radiation beam.

In this case, the method finally comprises the step of measuring and/or determining the angular inclination $\theta$ and the angular inclination fluctuations $\Delta\theta$ of the electromagnetic radiation beam on the basis of the aforementioned first electrical signal Vs and second electrical signal Vr.

According to different possible application options of the method, the electromagnetic radiation beam is a laser beam at a frequency belonging to an infrared or visible or ultraviolet detectable frequency range, or the electromagnetic radiation beam is an X-ray beam, at a frequency belonging to a range of frequencies in the X-ray band. According to other implementation options, the electromagnetic radiation beam is a beam at other wavelengths different from the above mentioned wavelengths.

According to various possible implementation options, the method is performed by means of a device 1 and/or a system 10 according to any of the respective embodiments previously illustrated.

A system 30 for determining the stability and/or the vibration state of a mechanical structure M, comprised in the present invention, is now described, with reference to FIG. 10.

Such a system 30 for determining the stability and/or the vibration state of a mechanical structure M firstly comprises a laser beam source 31, configured to be optically coupled to the mechanical structure M (the stability and/or vibration state of which have to be determined), so as to determine a detection laser beam F, wherein a movement and/or vibrations of the mechanical structure M cause fluctuations in an incidence angle of the detection laser beam F.

The system 30 for determining the stability and/or the vibration state of a mechanical structure M also comprises a system 10 for measuring an angular inclination and angular inclination fluctuations of an electromagnetic radiation beam, according to any of the embodiments previously described, arranged in such a way to receive the aforesaid detection laser beam F and determine the angular inclination fluctuations of this detection laser beam F.

The processing means 20 of the system 10 for measuring an angular inclination and angular inclination fluctuations are further configured to determine the stability and/or vibration state of the mechanical structure M on the basis of the determined fluctuations $\Delta\theta$ of the incidence angular inclination of the received detection laser beam.

According to an embodiment of this system 30, the laser beam source 31 is configured to be fixed to the aforementioned mechanical structure M in a stable and integral manner (thus obtaining the aforementioned "optical coupling"), so that a movement and/or vibrations of such a mechanical structure M cause fluctuations in the laser beam emission angle (in this case, the detection laser beam coincides with the laser beam emitted by the laser source).

According to another embodiment of this system 30, the aforesaid mechanical structure M comprises a reflecting surface (for example, a mirror), fixed to the mechanical structure M in a stable and integral manner; the laser beam source 31 is configured to send the emitted laser beam onto the aforementioned reflecting surface; in this case, the aforementioned detection laser beam coincides with the laser beam reflected by the reflecting surface, determined by the reflection of the laser beam emitted by the laser source and incident on the reflecting surface.

In this case, the system 30 for measuring an angular inclination and angular inclination fluctuations of an electromagnetic radiation beam is configured to receive the laser beam reflected by the reflecting surface and to measure the angular inclination of this reflected beam, so that the angular inclination of the reflected beam, and the fluctuations thereof, are indicative of movements and/or vibrations of the reflecting surface, which are in turn represents corresponding movements/vibrations of the mechanical structure.

A method for determining the stability and/or the vibration state of a mechanical structure M, comprised in the present invention, is now described.

According to an embodiment, such a method for determining the stability and/or vibration state of a mechanical structure M comprises the steps of: integrally fixing a laser beam source 31 to the mechanical structure M (the stability and/or vibration state of which have to be determined), so that a movement and/or vibrations of the mechanical structure M cause fluctuations in the emission angle of the laser beam F; then, emitting a laser beam F by the aforementioned laser beam source 31; then, determining angular inclination fluctuations $\Delta\theta$ of the emitted laser beam, by means of a method for measuring an angular inclination and angular inclination fluctuations of an electromagnetic radiation beam, in accordance with any of the previously described embodiments; finally, determining the stability and/or the vibration state the mechanical structure M based on the determined fluctuations $\Delta\theta$ of the angular inclination of the laser beam.

According to another embodiment, this method for determining the stability and/or the state of vibration of a mechanical structure comprises the steps of: solidly fixing a reflecting surface to the aforementioned mechanical structure, so that movements and/or fluctuations of the structure mechanics determine corresponding movements and/or fluctuations of the reflecting surface; then, emit a laser beam from the laser beam source, and direct the emitted laser beam onto the aforementioned reflecting surface, to generate a corresponding laser beam reflected by the reflecting surface.

The method then involves determining angular inclination fluctuations ($\Delta\theta$) of the reflected laser beam, by means of a method for measuring an angular inclination and angular inclination fluctuations ($\Delta\theta$) of an electromagnetic radiation beam, according to any of the forms of realization of this method previously described; and finally to determine the stability and/or the state of vibration of the mechanical structure on the basis of the determined fluctuations ($\Delta\theta$) of the angular inclination of incidence of the reflected laser beam.

In the following, as an example, an embodiment of the device (which will also be referred to as a "module") and of the system for the measurement of angular inclination and fluctuations thereof, according to the present invention, will be described in greater detail.

Examples of the usable and/or preferred values of the aforementioned quantities will also be provided; a mathematical model of the physical phenomena on which the device and the system are based will be presented; the achievable performances will be indicated, citing some results of functional tests that have been carried out.

In the embodiment described herein (shown in FIG. 3), the module (i.e., the device) consists substantially of two slits (aligned on the optical axis of the laser beam or on a previously chosen direction), by a beam splitter and two photodiodes, one after each slit, properly filtered to take full advantage of their capabilities.

The physical principle on which the operation of the module is based involves the measurement of the diffraction figure of a coherent wave generated by its passage through a slit. The energy/power variations of the laser beam on the Ps photodiode, placed after the second slit S2, depend on the displacement of the diffraction pattern on the plane of the slit S2 and, obviously, also on the variation of the laser energy/power itself. In order to measure only the variations induced by the displacement of the diffraction pattern (due to the beam input angle in the module), the energy/power of the laser beam is measured on the other photodiode Pr, acting as the reference photodiode, in the sense that the energy/power of the laser beam constitutes a reference value, with respect to which the result obtained from the main photodiode of detection Ps (placed after the second slit) is normalized.

The device is therefore able to measure the incidence angular inclination of the laser beam. In fact, this incidence angular inclination causes a displacement on the second slit of the diffraction pattern generated by the first slit, thus creating a variation of energy/power on the photodiode Ps.

Theoretical Model

Consider a laser beam with a Gaussian spatial profile, a "spot" parameter $w_x$ in the horizontal direction and a "spot" $w_y$ parameter in the vertical direction:

$$\text{gauss}(x, y) \overset{def}{=} e^{-\left(\frac{x^2}{w_x^2} + \frac{y^2}{w_y^2}\right)}$$

Let Pr be the photodiode positioned on the reflection of the beam splitter placed after the first slit (S1 having a width d1). The signal generated by Pr provides the reference for the correction of laser power fluctuations.

Let Ps be the photodiode positioned after the second slit (S2 having width d2). Let L be the distance between the two slits, R the radius of curvature of the laser beam at the first slit and $\lambda$ its wavelength.

The spatial profile IH of the beam arriving on the second slit can be calculated through the Huygens integral:

$$IH(x, \delta\theta) = \left| \int_{-\frac{d_1}{2}}^{\frac{d_1}{2}} \text{gauss}(x_1, 0) \cdot e^{i \cdot \frac{2\pi}{\lambda} \sin(\delta\theta) \cdot x_1 + i \cdot \frac{\pi \cdot x_1^2}{R \cdot \lambda}} \cdot e^{+i \cdot \frac{2\pi}{\lambda} \cdot \frac{(x_1-x)^2}{2 \cdot L}} dx_1 \right|^2$$

where $x_1$ is the coordinate x on the plane transversal to the slit S1,
gauss($x_1$, 0) is the profile on the x axis of the input beam at S1, $$\frac{2\pi}{\lambda} \cdot \sin(\delta\theta)$$

is the projection of me wave vector k on the transversal plane, considering an angular inclination $\delta\theta$, $$i \cdot \frac{\pi \cdot x_1^2}{R \cdot \lambda}$$

is the transversal phase due to the curvature radius R, $$e^{i \cdot \frac{2\pi}{\lambda} \cdot \frac{(x_1-x)^2}{2 \cdot L}}$$

is the free propagation of a spherical wave with a parassial approximation.

In the Huygens integral, the vertical coordinate has not been considered: in fact the configuration of the apparatus allows to neglect the effect of the evolution along the coordinate y.

Now, let us normalize to a value 1 the peak of the profile, which is in a position shifted by a length L·$\delta\theta$ along x:

$$IHN(x, \delta\theta) \overset{def}{=} \frac{IH(x, \delta\theta)}{IH(L \cdot \delta\theta, \delta\theta)}$$

Figure 5A:
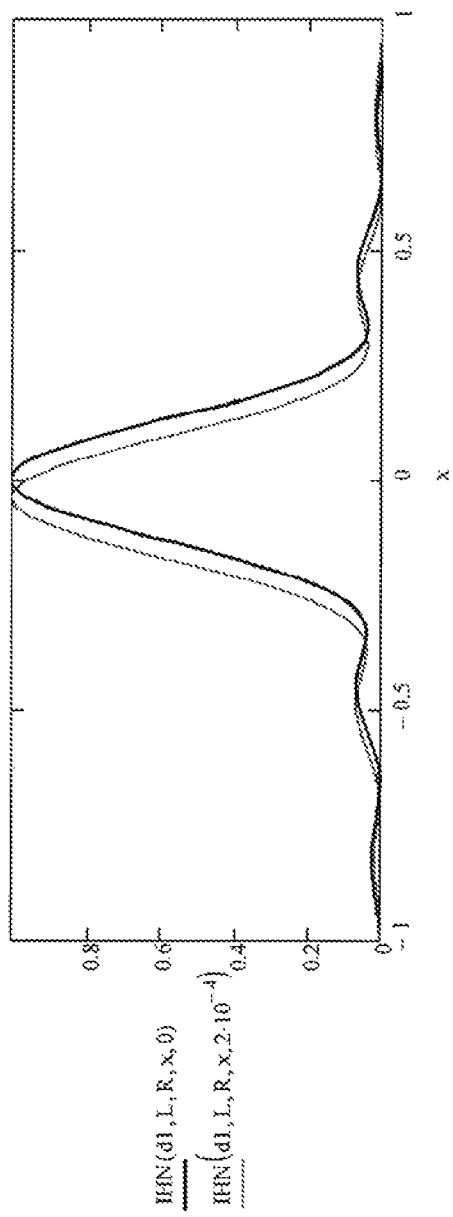
FIGS. 5A and 5B represent diagrams of a spatial displacement of a diffraction figure of a beam treated by the device according to the invention, in the presence of an angular inclination of 200 µrad.

FIG. 5A shows an example of the movement of the laser beam along the x axis (in mm) in the presence of an angular inclination $\delta\theta$=200 µrad (curve traced with thin line), in a system in which d1=0.4 mm and L=200 mm, $\lambda$=670 nm, with regard to a situation with angular incidence equal to 0 (curve traced with thick line).

To obtain the power fraction that passes through the second slit S2, the following integral can be calculated:

$$P_s(\delta, \delta\theta) = \frac{1}{N} \cdot \int_{-\frac{d_2}{2}+\delta}^{\frac{d_2}{2}+\delta} IHN(x, \delta\theta) dx$$

where $N \overset{def}{=} \int_{-\infty}^{\infty} IHN(x, \delta\theta) dx$ is a normalization coefficient of the integral, and $\delta$ is an optimal displacement along the x-axis of the slit S2 (a displacement which was also previously indicated as shift $\Delta x$). The application of this displacement is advantageous to render the system significantly more sensitive to beam angular fluctuations. In fact, there is an optimal shift of S2 along x which allows to obtain the highest possible sensitivity.

By virtue of this optimal displacement $\delta$, the angular fluctuations of the beam correspond to the highest possible power fluctuations after the slit S2. A more complete explanation of this point will be given below.

Figure 5B:
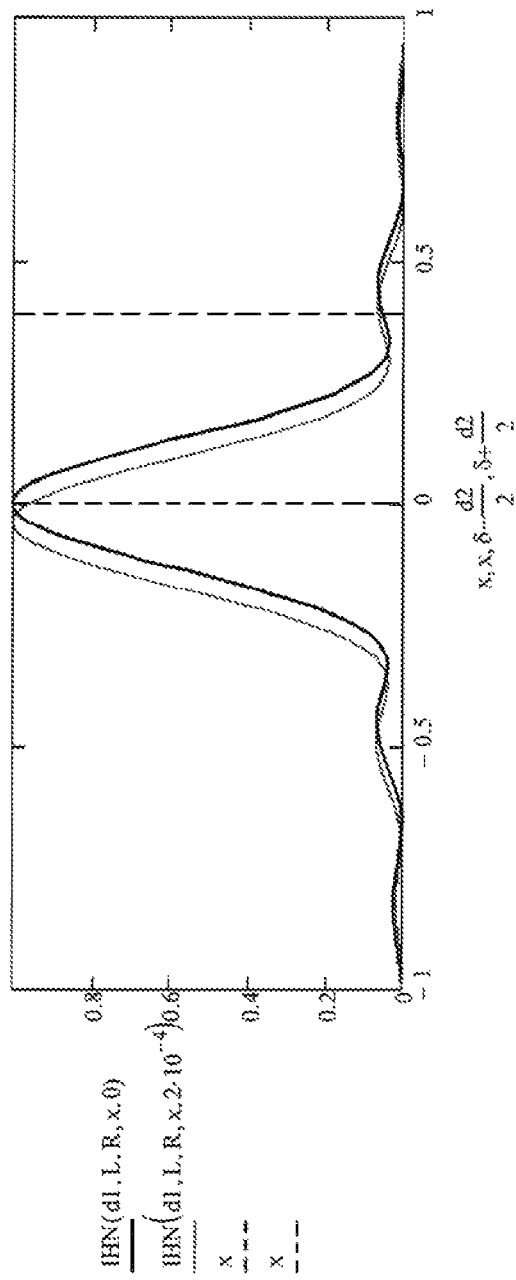

FIG. 5B (abscissa in mm, ordinate in normalized units) illustrates how the optimal displacement $\delta$ coincides with the portion of spatial profile having the highest derivative.

Figure 6:
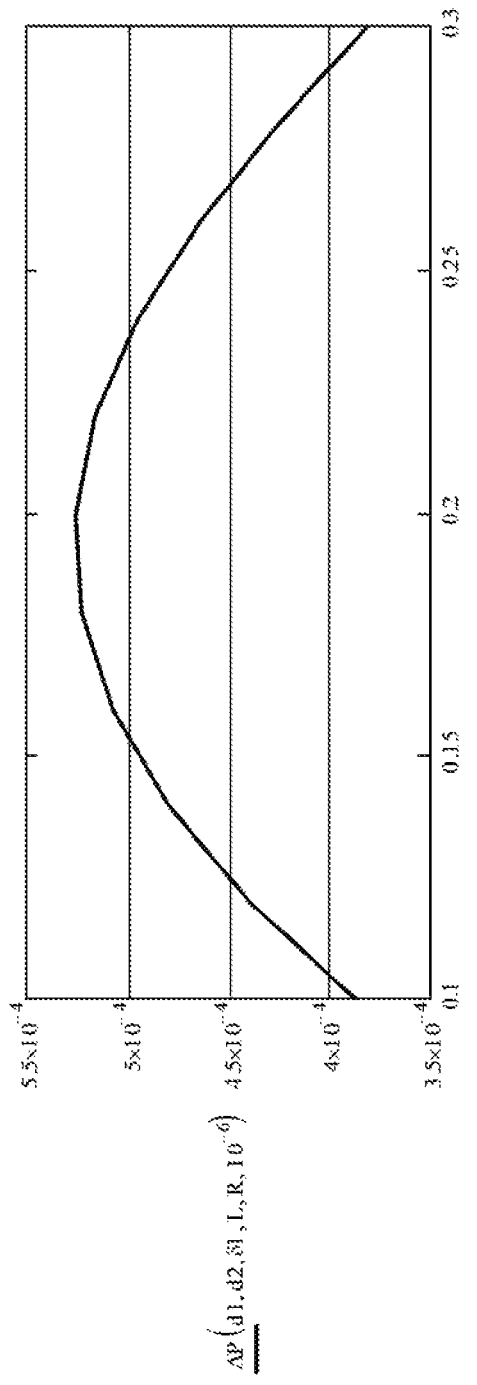
FIG. 6 illustrates a simulation of the power fluctuations ΔP detected by the device, in the presence of an angular incidence fluctuation of 1 µrad, as a result of a spatial deviation between two slits included in the device according to the invention.

FIG. 6 illustrates the power fluctuations $\Delta P$ on the photodiode Ps, defined as:

$$\Delta P(\delta, \delta\theta) \overset{def}{=} \left| P_s\left(\delta, \frac{\delta\theta}{2}\right) - P_s\left(\delta, -\frac{\delta\theta}{2}\right) \right|$$

For a particular implementation example of the device, on which tests were carried out, reporting on a graph the power fluctuation due to 1 µrad of angular fluctuation as a function of $\delta$, it is found that the optimal displacement to maximize the signal at the output of the module is $\delta$=0.2 mm, as shown in the example of FIG. 5 (abscissa in mm, ordinate in normalized units).

It should be noted that, in the range of angular inclination values for which the module is designed, the power variation after the slit S2 depends linearly on the angular inclination of the beam. For example, with the module configured as indicated above, for θ <500μrad the regime is still linear. In fact, at 500 μrad, approximating the system still as linear causes only an error of 1.5%.

Figure 7:
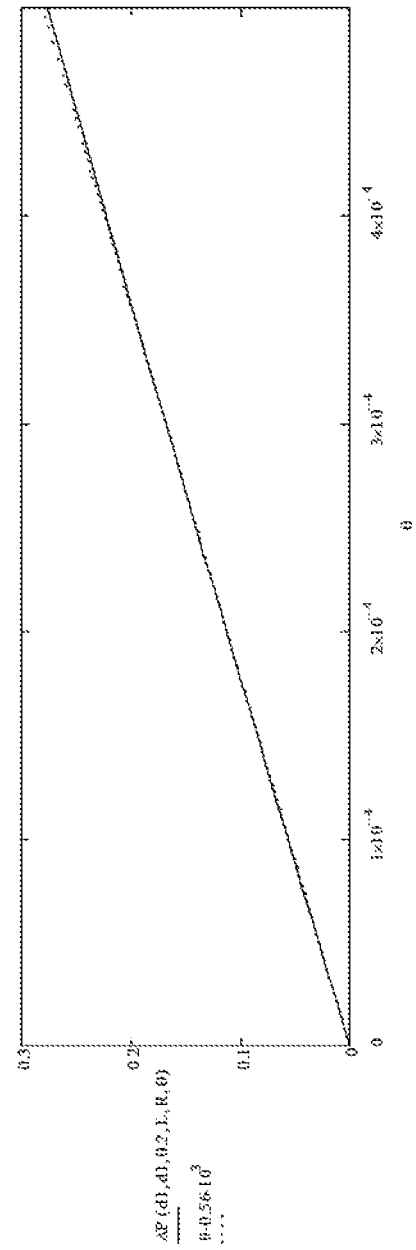
FIG. 7 is an exemplary diagram showing the linearity of the response of an output signal of the device as a function of the angular inclinations of the input of the beam.

This is illustrated for example in FIG. 7, which shows the linearity of the response (in normalized units) of the module as a function of angular inclinations (abscissa in rad).

Simple changes in the geometry of the device make it possible to maintain linearity for more important angles, for example by using narrower slits or greater gap between slits. In any case, it should be noted that a 500 μrad fluctuation is enormous compared to the typical angular fluctuations of interest in laser installations (or in other applications of interest of this method).

The sensitivity of the module is a very important topic. It is necessary to be able to keep under control all the noise sources that could give a too high background noise, that is power fluctuations big enough to hide the signal fluctuations due to the angular fluctuations of the laser. Below, these noise sources will be treated and the sensitivity of the module will be evaluated under different conditions.

To predict the fluctuations in terms of voltage and study the sensitivity of the system, it is advisable to convert the results relating to the percentage of power that passes through the slit S2 into the voltage supplied by the detectors during the measurement.

Let $T_{BS}$ and $R_{BS}$ be the parts transmitted and reflected, respectively, by the beam splitter positioned after the slit S1. The voltage detected by the photodiodes Ps and Pr can be obtained by knowing, for each detector, the transimpedance R, the responsiveness η and the filtering F chosen. Pr, which measures the reference power, can be expressed as:

$$V_r(d_1) = R_{BS} \cdot \eta_r \cdot R_r \cdot F_r \cdot P_r(d_1)$$

where Pr (d1) is the power passing through the slit S1, i.e.:

$$P_r(d_1) = \frac{1}{area} \cdot \int_{-\frac{d_1}{2}}^{\frac{d_1}{2}} \int_{-\frac{height}{2}}^{\frac{height}{2}} gauss\,(x, y) dx dy$$

wherein area $\overset{def}{=} \int_{-\infty}^{\infty} \int_{-\infty}^{\infty}$ gauss(x,y) dx dy allows to normalize the integral, and "height" is the height of the slit S1 (i.e., the opening along the direction y).

For the photo-diode Ps, when δθ=0, the voltage is:

$$V_s(\delta) = T_{BS} \cdot \eta_s \cdot R_s \cdot F_s P_r(d_1) \cdot P_s(\delta, 0)$$

The power fluctuation due to a total angular inclination be can be defined as:

$$\Delta V(\delta, \delta\theta) = T_{BS} \cdot \eta_s \cdot R_s \cdot F_s \cdot P_r(d_1) \cdot \Delta P(\delta, \delta\theta)$$

By measuring the power that passes through the first slit, it is possible to compensate for fluctuations in laser power so that they are not part of the fluctuations detected by Ps and therefore do not contribute to ΔV. To do this, the voltage Vr is multiplied by a factor Γ in order to obtain the same voltage on the two detectors, and then the two signals are subtracted so as to obtain "zero" when δθ=0. Thus, on the detector Ps, only angular fluctuations are seen and no longer the fluctuations of laser power.

However, the compensation between Vs and Vr is not perfect. The error of this calibration can be quantified through the factor $$\beta \overset{def}{=} \frac{V_S(\delta) - \Gamma \cdot V_r(d_1)}{V_s(\delta)}$$

When an error β is present, each power fluctuation contributes to the fluctuations detected by Ps with a weight dictated by β. In fact, by defining $\Delta rel_{laser}$ the relative fluctuation of laser power, the respective voltage fluctuation will be $$\Delta V_{laser}(\delta, \Delta rel_{laser}) = \beta \cdot \Delta rel_{laser} \cdot V_s(\delta)$$

Therefore, even in the presence of compensation, the laser power fluctuation still represents a noise source for the V (δ, δθ) signal.

Furthermore, another environmental noise component $\Delta_{env}$ must also be considered, which represents the noise introduced by the environment and the conditions under which it is measured; for example electronic noise, the noise of stray light entering the module, etc. In total, therefore, the noise is given by $$\Delta_{noise}(\delta, \beta, \Delta rel_{laser}, \Delta_{env}) = \sqrt{\Delta V_{laser}^2(\delta, \Delta rel_{laser}) + \Delta_{env}^2}$$

The following ratio is defined as Signal-to-Noise Ratio (RSR):

$$RSR(\delta, \delta\theta, \beta, \Delta rel_{laser}, \Delta_{env}) \overset{def}{=} \frac{\Delta V(\delta, \delta\theta)}{\Delta_{noise}(\delta, \beta, \Delta rel_{laser}, \Delta_{env})}$$

Obviously, in order to measure a power fluctuation due to an angular fluctuation δθ, it is necessary that $$RSR(\delta, \delta\theta, \beta, \Delta rel_{laser}, \Delta_{env}) > 1$$

Figure 8:
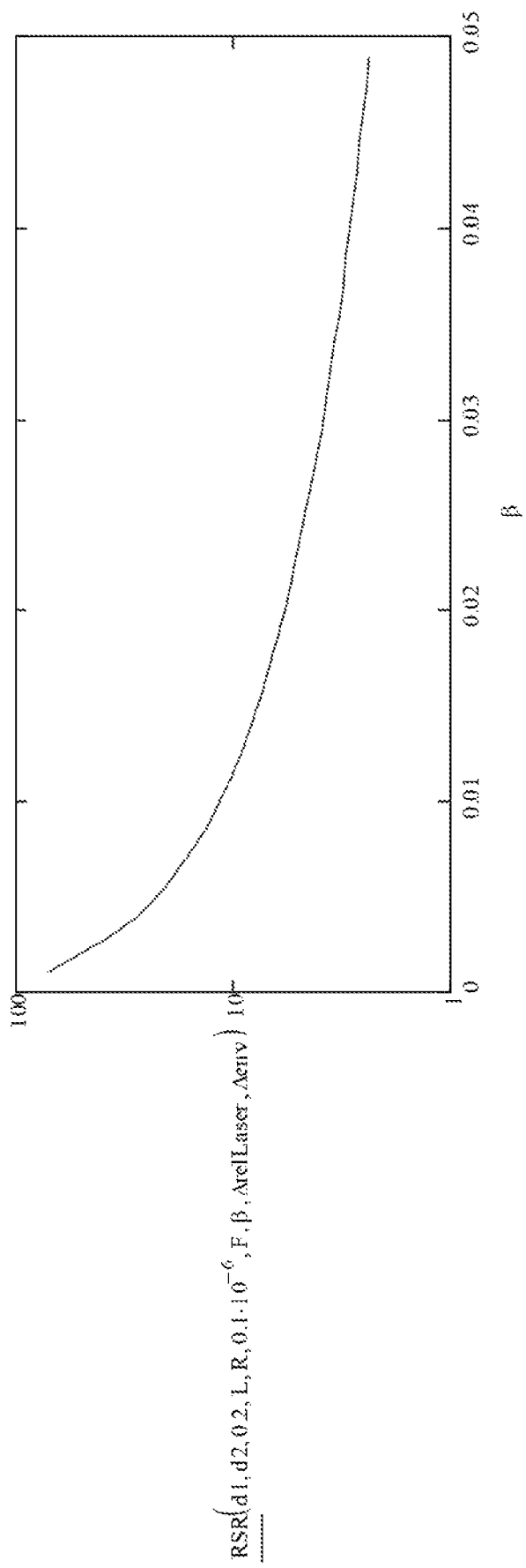
FIG. 8 shows a signal to noise ratio of an output signal of the device as a function of a calibration error β.

FIG. 8 shows the signal-to-noise ratio as a function of β, in the case of two 0.4 mm wide slits at a distance of 200 mm. Using experimental values for noise sources, i.e., $\Delta_{env}$=150 μV (integrated noise up to 10 kHz), $\Delta rel_{laser}$~0.001 of a 4 mW laser diode, it was experimentally observed that it is easy to obtain a β≈0.002 error. Thus, a signal is obtained that is at least 50 times the total noise of the module when an angular fluctuation of only 0.1 μrad is measured, which determines high performance in terms of resolution and measurement accuracy.

It should be noted that the device can measure very rapid angular fluctuations, up to frequencies of the order of MHz. This characteristic allows to measure the noise spectrum, i.e., to make a Fourier transform of the signal Vs and to clearly distinguish the contribution of each spectral component of the noise (see, for example, FIG. 13, which will be illustrated below). Thanks to this, the environmental noise, being concentrated at very specific frequencies, can be completely neglected in the case of signals that are not in those specific frequencies, and this drastically improves the sensitivity of the apparatus.

Figure 9A:
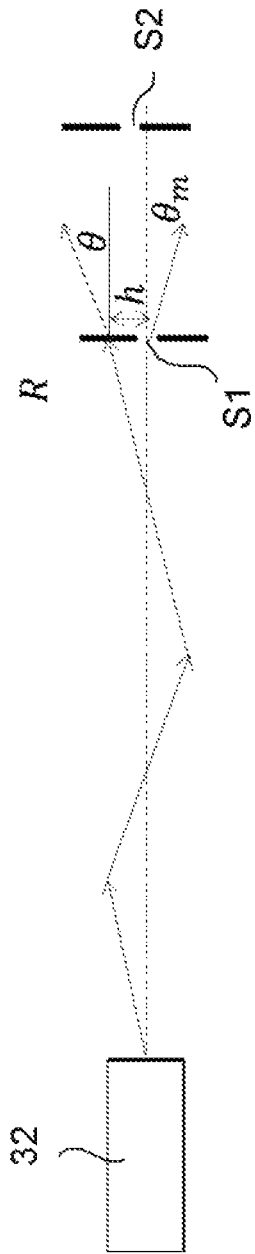
FIGS. 9A, 9B and 9C show some geometric parameters relating to measurements of the method according to the invention, in various possible use cases.
Figure 9B:
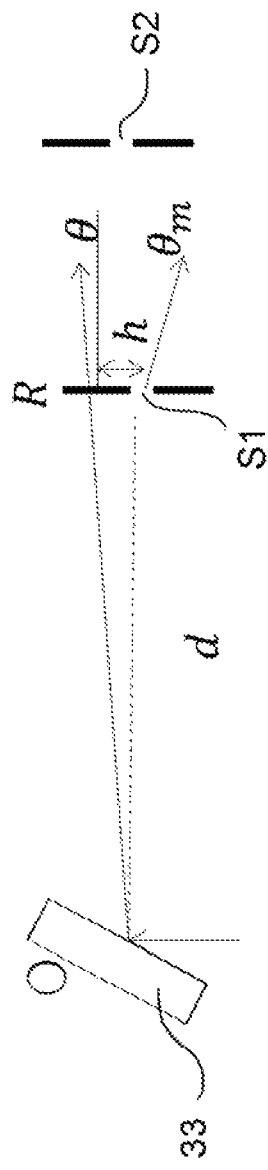
Figure 9C:
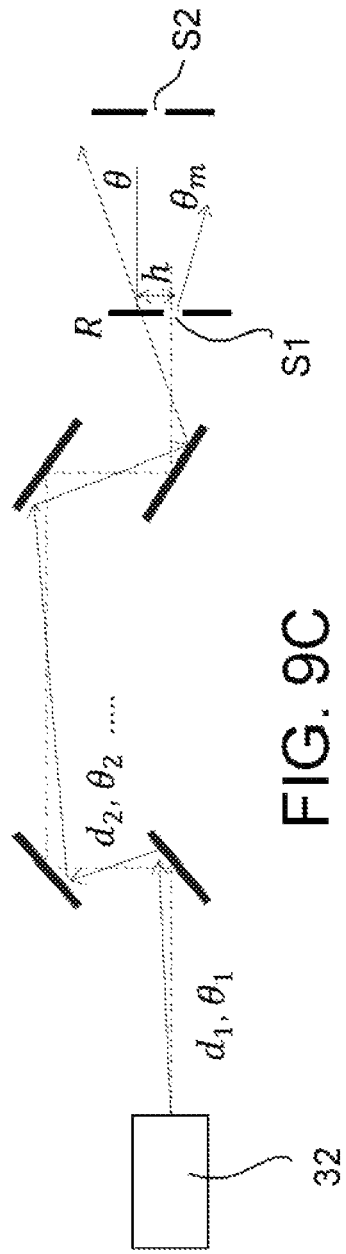

Turning back now to geometric aspects of the detection, it is important to note that the measured inclination signal (which is here defined Om) is not necessarily equal to the angular deviation θ of the beam (i.e., the variable to be detected), since a component of what is measured is linked to the lateral displacement h of the beam on the slit S1. The impact of this component on the measurement depends on the radius of curvature R of the beam on the plane of the first slit. To better explain this phenomenon, consider FIG. 9A, representing a laser 32 that, in its path from the source to the module, encounters different sources of angular noise. On the plane of the first slit the beam is defined by three parameters:

θ: the angle of propagation or inclination (i.e., the variable to be measured)

R: the radius of curvature h: the displacement of the laser with respect to its propagation axis, i.e., that is the spatial shift measured on the plane to which the first slit belongs, that is to say the plane of the first screen.

Note that, strictly speaking, the displacement should also appear in the Huygens integral for the gauss beam (x, y) at the input of the first slit, which should therefore be gaussian (x-h, y), but it is so small compared with to the size of the beam that this effect is completely negligible and is also eliminated from the compensation.

The following relationship applies to the aforesaid parameters:

$$\theta_m = \theta - \frac{h}{R}$$

The measured angle θm tends to coincide with the real inclination angle θ when h is much less than R.

However, the parameter h depends on all the optics between the laser source and the module.

Three cases can occur.

In a first case, the source of the angular fluctuation is known (for example, a controlled actuator 33 in an apparatus configured for a test). In this case (illustrated in FIG. 9B), the following relation holds:

$$\theta_m = \theta - \frac{h}{R} = \theta - \frac{d \cdot \theta}{R} = \left(1 - \frac{d}{R}\right) \cdot \theta$$

where d is the known distance between the source of the angular fluctuations and the input of the module. The knowledge of the distance d allows to take this effect into account, and to extrapolate the correct value θ from the measured value of $\theta_m$. Alternatively, if d is much less than R, the measured value $\theta_m$ can be considered an excellent approximation of θ.

In a second case, the source of the angular fluctuations is not precisely known, but it is known that the beam is collimated, and therefore R is very large. In this case (illustrated in FIG. 9C), the following relation holds:

$$\theta_m = \theta - \frac{h(d_1, \ldots, d_n, \theta_1, \ldots, \theta_n)}{R}$$

Assuming that the noise sources are not correlated, the average values of the fluctuations are $$h = \sqrt{\Sigma_i(d_i \cdot \theta_i)^2} \quad \theta = \sqrt{\Sigma_i(\theta_i)^2}$$

If it is considered that $d_i \leq LO$, for each i, where LO is equal to the sum of the paths of, that is, is the total length of the theoretical optical path, we get:

$$h = \sqrt{\sum_i (d_i \cdot \theta_i)^2} \leq \sqrt{LO^2 \cdot \sum_i (\theta_i)^2} = LO \cdot \theta$$

So, in the worst case, the following relation is obtained:

$$\theta_m = \theta - \frac{L}{R} \cdot \theta$$

To get θm to be almost equal to θ, it is sufficient that the following relation is respected:

$$\frac{L\theta}{R} \ll 1$$

This relation is strictly true in the case of an ideal collimated beam having an infinite radius of curvature R, and is very well approximated for laser beams that are almost perfectly collimated (a case that is realistically very frequent). Note that it is not necessary to know R on the whole path of the beam, but only on the plane of the first slit.

Outside the previous analysis, there is only a third case (less frequent) left, in which the source of the angular fluctuations is not precisely known, and it is known that the beam is not collimated, but rather focused or divergent (for example, due to the presence of lenses or other optics) and therefore R is relatively small.

In these cases, the measured value $\theta_m$ markedly differs from the inclination value θ, and the appropriate formulae must be applied without approximations. Moreover, the measured value θm is more representative of the spatial displacement h of the beam on the first slit than of the incidence angular inclination.

The device and the system according to the invention have been subjected to numerous laboratory tests, with different beam sources, for example with a 670 nm wavelength and 4 mW power continuous laser diode, with a 633 nm wavelength and 7 mW power He—Ne laser and (as a test for a large laser installation), with a 800 nm wavelength and 500 mW power laser diode with a diameter of 14 cm.

Figure 9D:
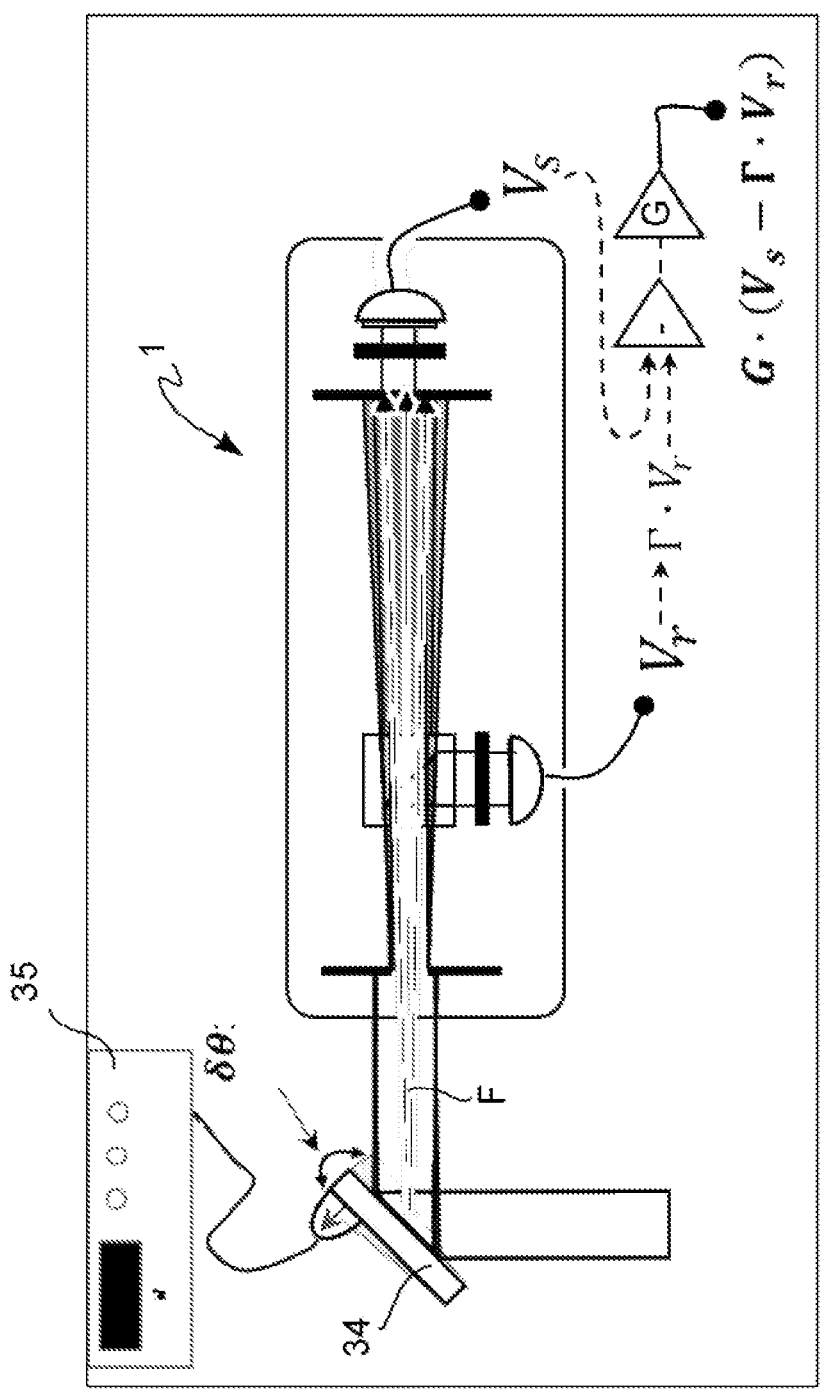
FIG. 9D shows an example of test configuration of the device according to the invention.
Figure 11:
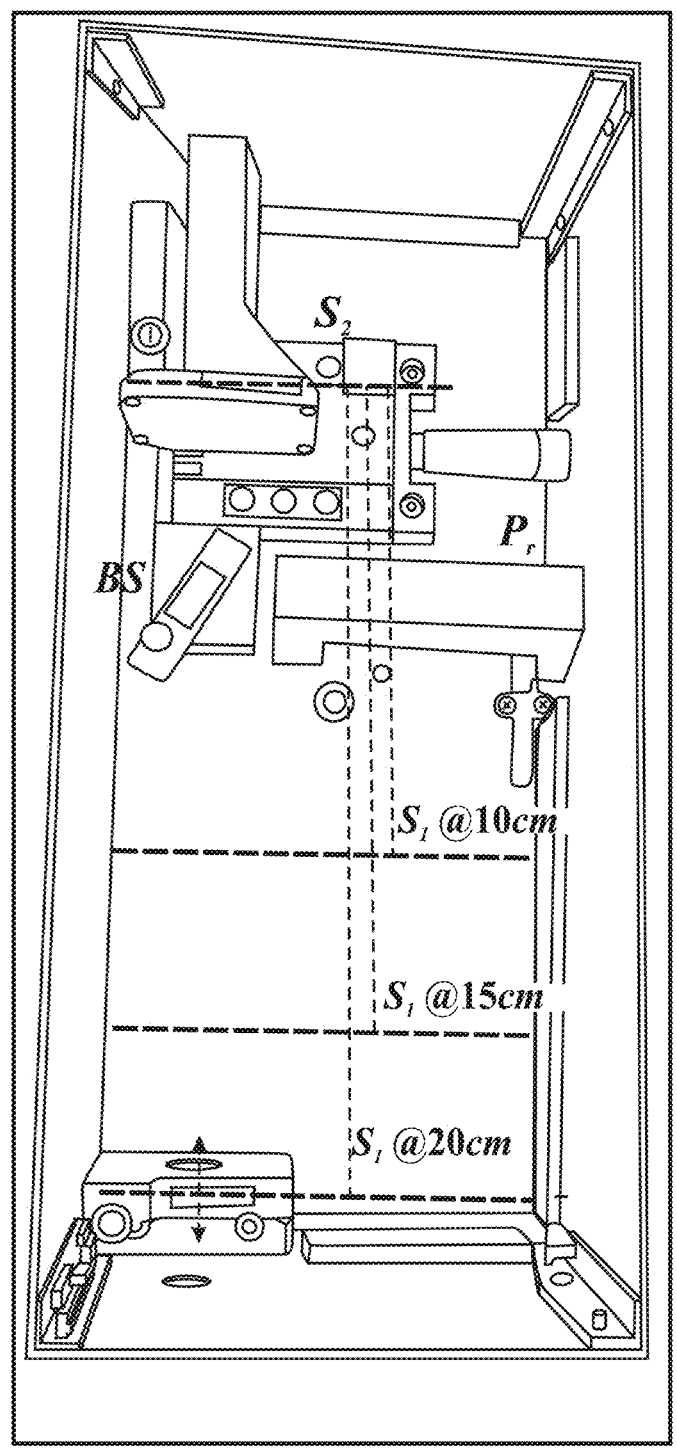
FIG. 11 is a photograph of an embodiment of the device according to the invention, seen from above.

FIG. 9D shows the device in the test configuration, with a mirror 34 operable in a controlled manner so as to determine desired angular inclination fluctuations, controlled by a controlled voltage generator 35 adapted to drive the mirror connected to a piezoelectric actuator which changes the inclination thereof. The device was tested, for example, in a configuration with slit openings d1=d2=0.4 mm, and a variable gap distance (setting the device in different configurations) L=20 cm or L=15 cm or L=10 cm. FIG. 11 shows the device used for the tests, in which the module as a whole is easily aligned on the beam thanks to translation and rotation slides placed under the module itself, and the distance between the slits (i.e., between the screens in which they are obtained) can be set to different values (for example, as already noted above, 20 cm, 15 cm and 10 cm).

According to an implementation example, the only movement required (and sufficient for this purpose) is the movement of the slide which transversely moves the second slit.

The calibration of the oscillating piezoelectric element can be carried out according to known procedures.

The data collection and the alignment procedure of the module on the laser beam can be carried out according to known procedures.

During the measurements, three module outputs can be monitored, i.e. Vr, Vs and V, where V is the compensated signal, i.e., the signal already corrected with regard to the laser power fluctuations (as previously illustrated):

$$V(d_1, \delta) = G \cdot (V_s(\delta) - \Gamma \cdot V_r(d_1))$$

where G is a gain that is part of the electronics, useful for cleaning the signal. Typically, in tests, G can be in the range 16-20. According to other implementation options, G can assume a value comprised between 20 and 60, and more particularly G is, for example, equal to 50.

The alignment of the device with respect to the beam is very simple. It is needed to place the module where the measure is desired on the laser beam path in such a way that the beam covers the input slit (if it is larger than the slit) or is centered on it (if it is smaller of the slit height). This ca be done manually, since an accuracy of a few millimeters is sufficient.

To align the device, an axis of rotation parallel to the axis of the slits (height of the slits), which makes the whole module rotate, and a translation axis parallel to the plane of the slits and in a direction perpendicular to their axis, allowing to translate the whole device, can be useful.

In this regard, according to an embodiment, the device comprises, integrated therein, a further translation system (for example, miniaturized), parallel to the plane of the slits and in a direction perpendicular to their axis, which allows to move along only x the slit S2 to set the optimal deviation δ (or Δx).

The steps for preparing the device, according to an embodiment of the measurement method, are as follows:
1) position the module so that the beam passes through the first slit and that its axis is parallel to the beam axis;
2) looking at the DC direct output Vs (initially, normally, Vs=0, otherwise carry out the phase described in the following point 3), rotate around the rotation axis indicated above to obtain a signal start;
3) use the slide to translate the entire device along the x direction, to maximize the Vs signal;
4) repeat steps 2) and 3) until the signal is maximized; before setting the power fraction (and performing the next step 5) it is advisable to check, by finely moving the slide of the slit, that it is exactly on the maximum of the measured power;
5) translate the second slit so as to reduce the voltage Vs by a quantity that depends on the wavelength λ of the laser; in this regard, it is possible to use a table or characterization chart, which is supplied along with each device, which defines the percentage of Vs that must be set for the module to be ready for measurement (see the diagram on the left of FIG. 12A). This reduction, or "abatement" of the voltage Vs serves to easily set the right value of the optimal deviation δ (or Δx). To obtain the correct value of the deviation δ the value of Vs is reduced by a quantity defined in the calibration graphs; therefore, when the slide to which the second slit of the right quantity δ is connected, at the same time the value of Vs falls with the right ratio indicated in the calibration curves;
6) looking at the compensated DC output V, optimize the correction to get V=0;
7) put the V output in Alternate Current AC to observe the fluctuations.

The procedure described above allows the module to be aligned and already set so that the laser power fluctuations are corrected and do not affect the measurement.

Figure 12A:
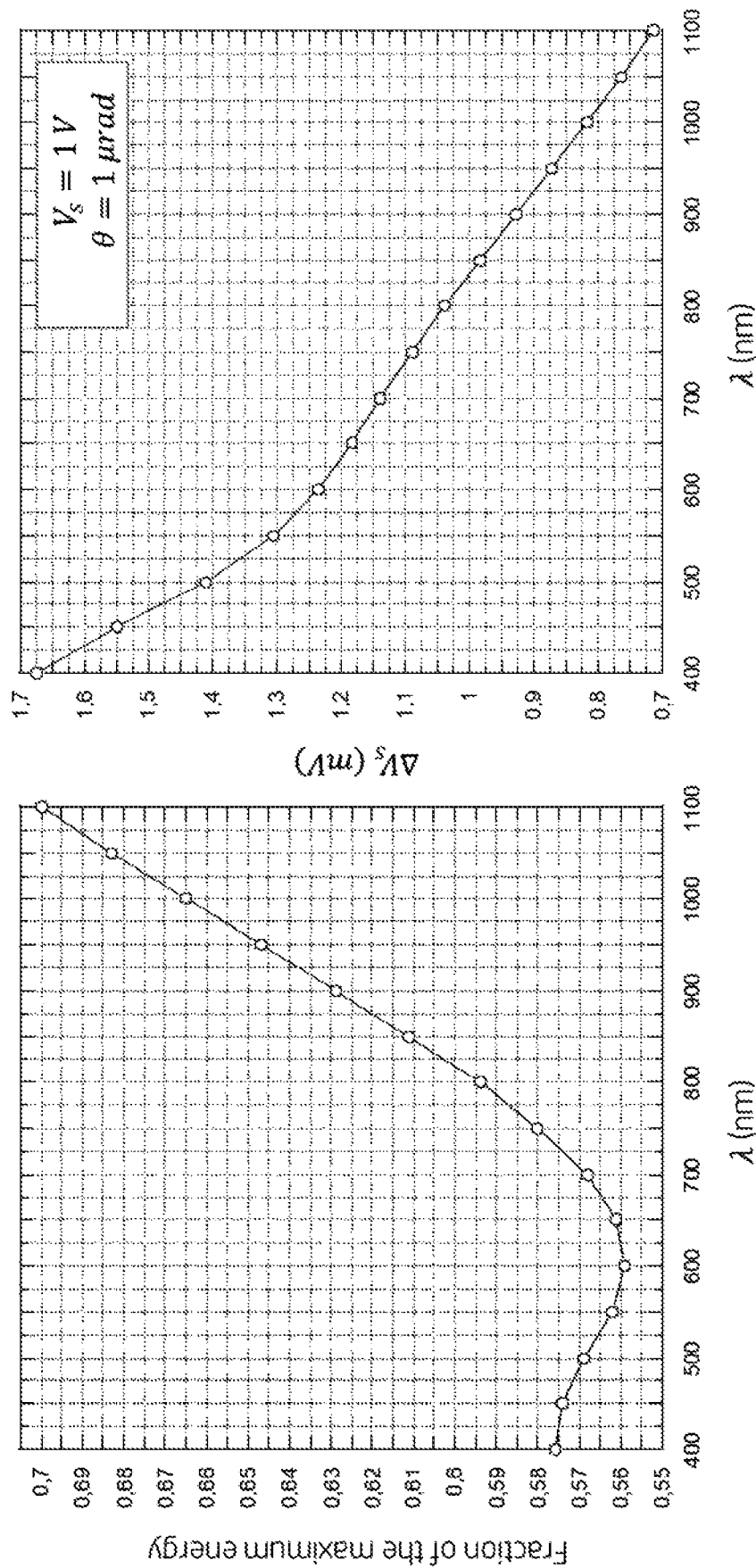
FIGS. 12A and 12B shows two example diagrams for characterizing the device, which may be useful during use of the device itself.

It should be noted that the variations ΔVs depends on the wavelength λ: in the diagram on the right of FIG. 12A, the variation ΔVs of the signal Vs corresponding to an angular fluctuation θ=1 μrad is shown, in the case where Vs=1 V.

Since the output V corresponds to the output Vs compensated and amplified with a gain factor G, it is therefore necessary to consult the graphs in FIG. 12A, and then multiply the value found on the y-axis by the gain G set on the device.

Since the device responds linearly in the range of parameters for which it is used (as noted above), it is possible to use these tables/graphs to get all the necessary information. In fact, the result $\Delta V_s^{user}$ is obtained from the ΔVs obtained from the diagram of FIG. 12, corrected with a coefficient as explained in the following formula:

$$\Delta V_s^{user}(\lambda) = \Delta V_s(\lambda) \cdot \frac{V_s^{user}}{1V} \cdot \frac{\theta^{user}}{1\mu\text{rad}}$$

Figure 12B:
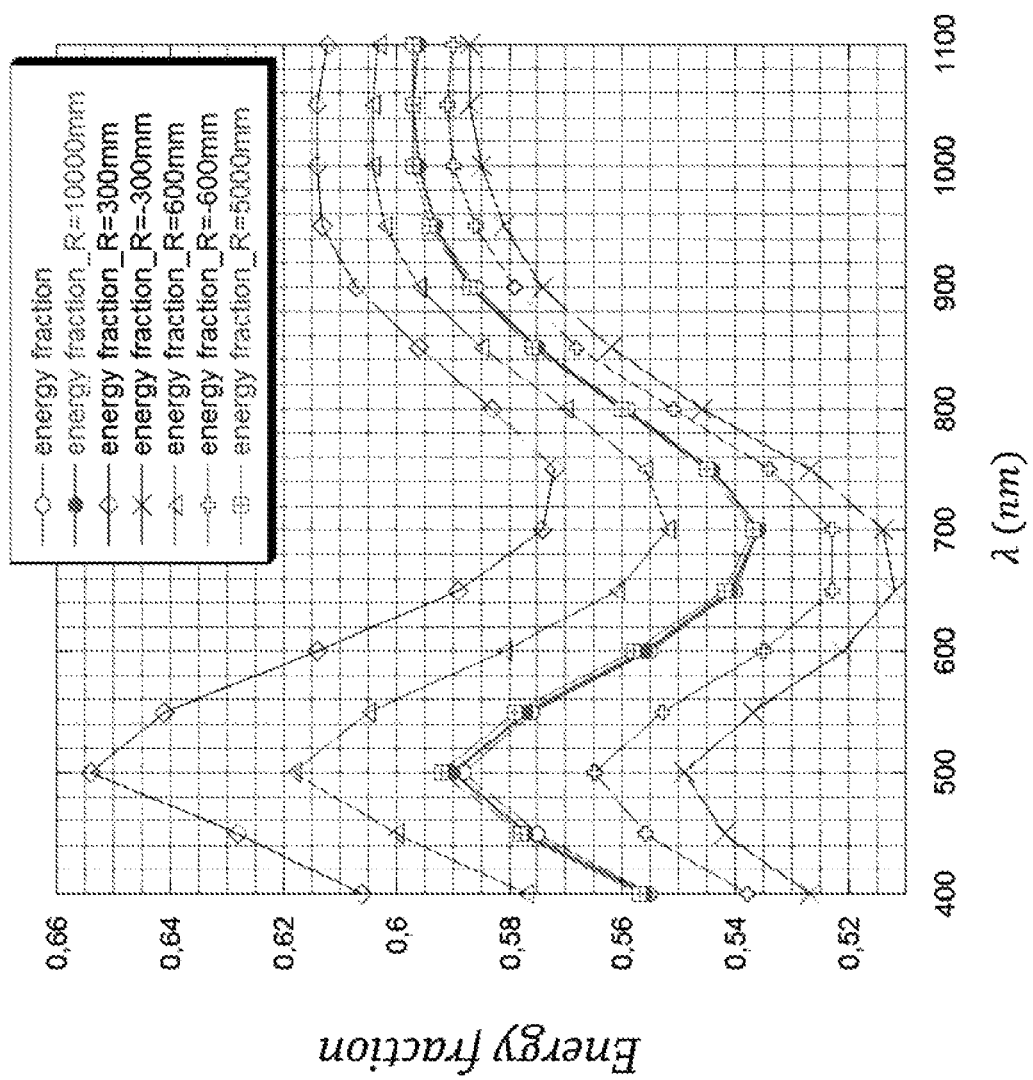

FIG. 12B illustrates a family of calibration curves calculated for different values of curvature radius R.

Figure 13:
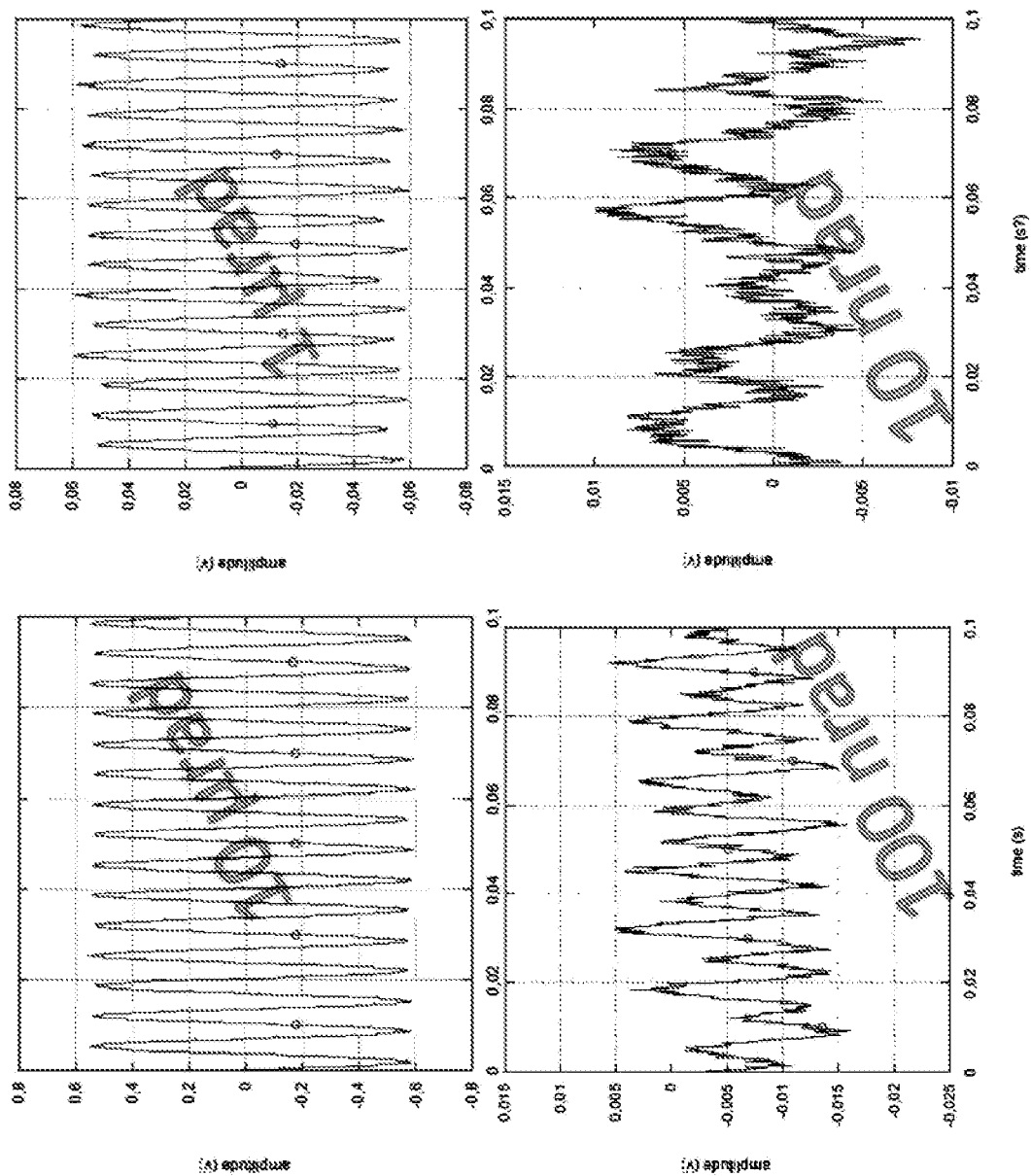
FIG. 13 illustrates the time trend of output signals of the device, corresponding to angular fluctuations of 10 µrad, 1 µrad, 100 nrad and 10 nrad.

FIG. 13 shows, by way of example, the results of some tests carried out, related to angular fluctuation measurements, over time, of amplitude 10 μrad, 1 μrad, 0.1 μrad (i.e. 100 nrad) and 0.01 μrad (i.e. 10 nrad).

Figure 14:
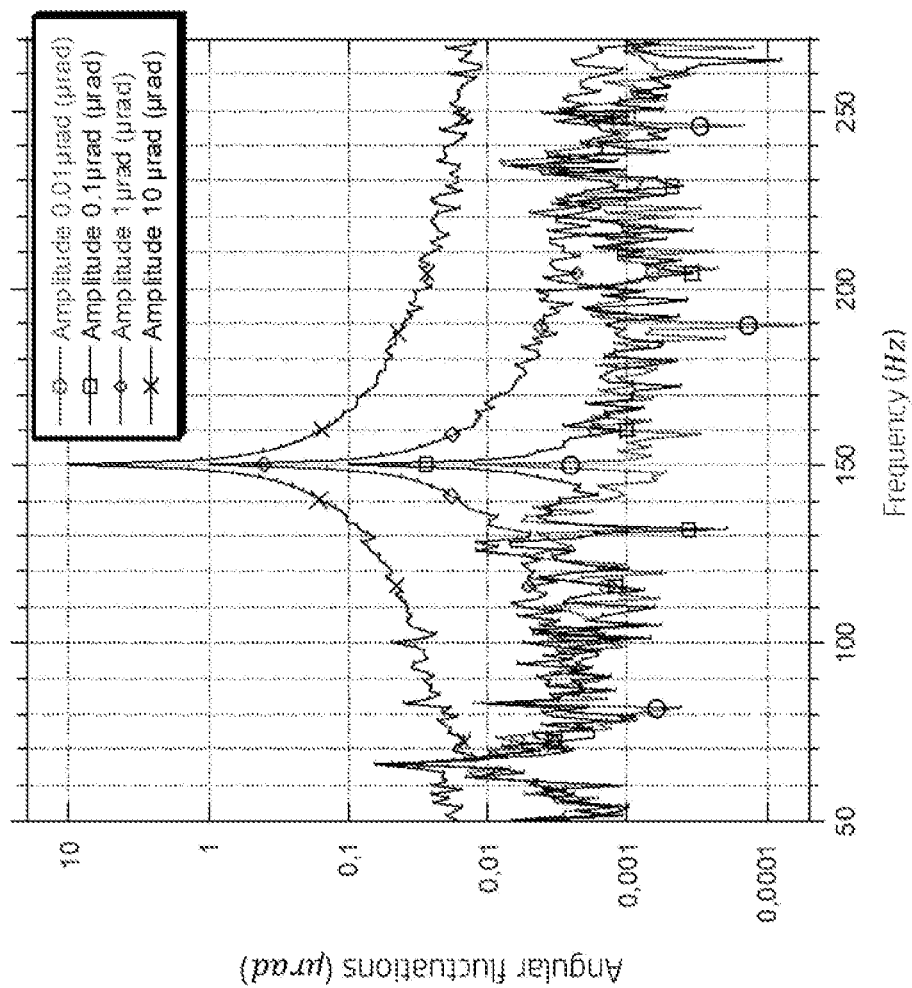
FIG. 14 illustrates the Fourier transforms (frequency spectra) of the four time signals illustrated in FIG. 13.

FIG. 14 shows Fourier transforms (frequency spectra) of the four time signals illustrated in FIG. 13. In this graph, the voltage values have been normalized so as to express the value in μrad (conversion valid for the peaks, used for quickly quantifying the fluctuation for each single frequency). The measurement demonstrates the system linearity and reveals a noise peak at 65 Hz, probably due to the air turbulence and the real noise that could be heard in the room where the test was performed, noise of the order of 50 nrad.

Summarizing what has already been remarked above, it should be noted that the function of the device is to measure the angular stability of a beam by exploiting the diffraction physics due to the presence of a slit or a bi-dimensional opening. When the beam has a certain inclination with respect to the axis of the device (previously aligned along a direction defined by the user, typically the ideal direction of the beam), the diffraction pattern generated by the slit is translated. The presence of a second slit and a power/energy detector, placed immediately after this second slit, allow to quantify the angular fluctuations, through the measure of the power/energy fluctuations after the second slit.

In fact, there is a linear correspondence between these power/energy fluctuations (detected after the second slit) and the beam angular fluctuations.

To ensure that the power/energy fluctuations related to the beam itself do not influence the measurement, that is, to discriminate the power fluctuations due to power variations of the beam from the power fluctuations caused by the angular fluctuation (which are the relevant ones), a reference beam power/energy is measured, for example along the beam path, immediately downstream of the first slit.

A method will now be described for measuring the deviation (hereinafter also referred to as a spatial "shift") of a laser beam, at the point where it is focused, with respect to the axis. This method is performed by means of a device for measuring angular inclination according to the previously described embodiments, used in an appropriate manner, as illustrated hereinafter.

In fact, the device 1, for example in the standard configuration shown in FIG. 1, can be used as a measurer of the spatial shift of a laser beam at the point where it focuses.

Figure 15:
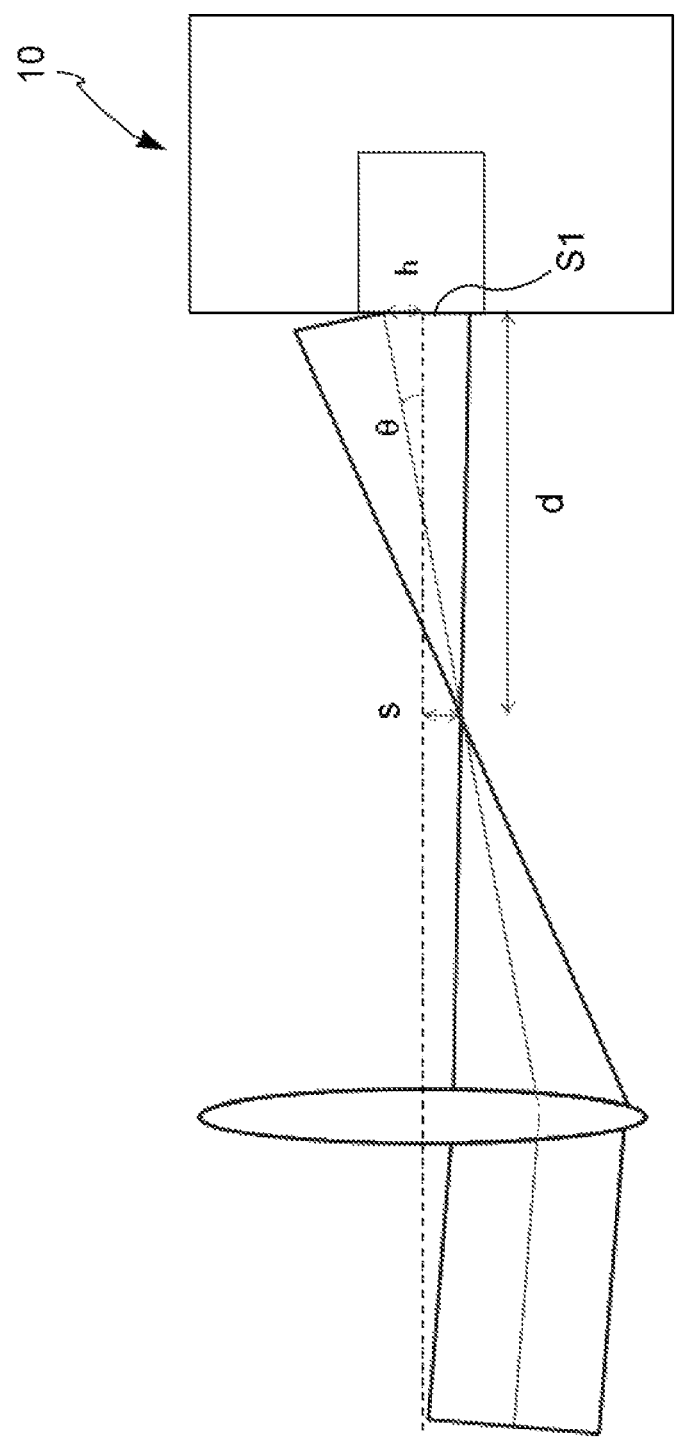
FIG. 15 illustrates the geometric variables relating to a method for measuring a spatial shift of a focused laser beam, included in the present invention.

In FIG. 15, the experimental configuration for the aforementioned spatial "shift" measurement is illustrated.

A laser beam is focused by a lens; at the focus point the laser beam spot is spatially displaced by a quantity "s" with respect to the reference optical axis. The quantity s is the spatial offset ("shift") to be measured.

The device is positioned after the focus point of the laser beam at a distance that is indicated as d. Alternatively, the device can also be arranged before the focus point, again at a distance d. The distance d refers to the distance between the focal point and the first slit S1 of the device.

The method provides to detect the incidence angular inclination of the laser beam according to any one of the previously illustrated embodiments of the method, and to calculate the spatial shift s of the focusing point of the laser beam with respect to the optical axis on the basis of the angular inclination of incidence θ.

In fact, the measurement of the angular deviation detected by the instrument is directly related to the spatial shift s, as will be illustrated below.

The fundamental relation that links the angle measured by the instrument $\theta_m$ to the angular deviation of the beam θ and to the spatial deviation h on the plane of the first slit is:

$$\theta_m = \theta - \frac{h}{R}$$

where R is the radius of curvature of the laser beam on the plane of the first slit S1 of the device.

The spatial offset h on the plane of the first slit is linked to the shift s in the focus by the following equation:

$$h = d\theta + s$$

(note that, in the particular case illustrated in FIG. 15, s has a negative sign with respect to h).

Replacing this last equation in the aforementioned fundamental relation, the following relation is obtained:

$$\theta_m = \theta - \frac{d\theta + s}{R}$$

Since d is the distance traveled by the beam after the focus point, the relation R=d holds, and therefore the above relation becomes:

$$\theta_m = \theta - \frac{R\theta + s}{R} = -\frac{s}{R}$$

Therefore, the angular deviation measured by the instrument is a function of s and R only. Since R is known, it is possible to derive the spatial shift s by measuring the angular inclination θm on the basis of the relation:

$$s = -R\theta_m$$

The measurement of the angular inclination $\theta_m$ is the measurement obtained with the method previously illustrated, using the calibration coefficient relative to the particular wavelength and radius of curvature of the specific laser beam.

Note that if the device is placed before the remote focus point at a distance −d the result does not change, because two sign changes occur, both for R and for d, thus keeping unchanged the above relation between the shift and the measured angular inclination θm.

Note also that, by means of this method, it is even possible to measure shift values s that are much smaller than the wavelength of the radiation used. In fact, as already indicated above, since by means of the angular inclination measurement method of the invention angular inclinations of the order of nano-radians can be measured, if one considers for example a curvature radius of 1 m, it is possible to measure beam spatial shifts s of the order of the nanometer.

In order for the shift measurement method to be reliable, d and R must be equal. This becomes true when the distance d to which the apparatus is placed is much larger than the so-called "Rayleigh range". The "Rayleigh range" zr depends on the size w0 of the spot at the focus:

$$zr = \pi(w0)^2/\lambda$$

where λ is the wavelength of the laser beam. As an example, in the following measurements in which w0=0.1 mm and λ=1064 nm, and therefore zr=29.5 mm, will be illustrated.

To keep this criterion under control it is appropriate to obtain the percentage difference between d and R, based on the equation that provides the evolution of the radius of curvature with respect to the distance from the focal point:

$$R(d) = \frac{zr^2}{d}\left(1 + \left(\frac{d}{zr}\right)^2\right)$$

from which it immediately emerges that, when d/zr>>1, R=d.

Figure 16:
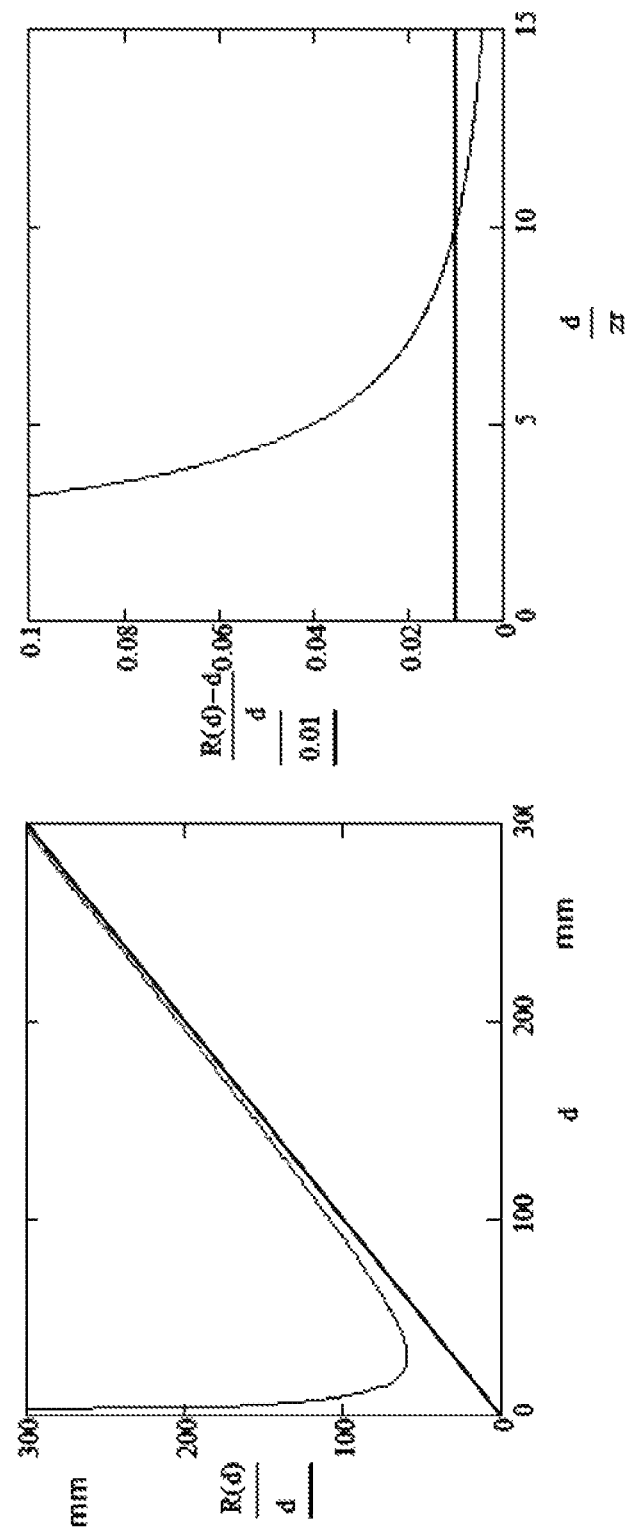
FIG. 16 depicts two diagrams illustrating respective relationships between geometric parameters of the aforementioned spatial shift measurement method.

FIG. 16, in the left part, shows the graph relating to the curve radius trend R (d) (curve traced with thin line) and distance d (curve traced with thick line) as a function of the distance for the case w0=0.1 mm and λ=1064 nm.

FIG. 16, on the right side, shows the graph relating to the relative variation between R and d as a function of the ratio between d and zr. Note that when d is about 10 times zr then R and d coincide within 1%. The measures that will be mentioned below refer to a condition of this type.

Note that this last graph generally indicates the discrepancy between R and d as a function of the relationship between d and zr, and therefore it can be used by the user to verify the validity of the method.

For the experimental verification of the aforesaid method for the measurement of the shift s, an experimental apparatus was used comprising a Nd: YAG laser source at 1064 nm, and then, downstream of the laser, some filters and a telescopic system to optimize the power and the size of the laser beam, then a lens with a 300 mm focal length, a mirror having an inclination controlled by a piezo actuator (also defined, herein below, as "piezo"), so as to determine a shift in the focus point by applying a voltage to the piezo, and finally a measuring device of the angular inclination of the laser beam according to the present invention.

The aforementioned Nd: YAG laser source has a width-adjustable iris located inside the cavity, which allows to change at will the spatial quality of the laser beam, to test the method with different spatial quality parameters $M^2$. In this apparatus, the rotation axis of the mirror is not at the point where the beam meets the mirror, therefore a mirror translation contribution of 3% was taken into account in determining the shift and this has been taken into account. The piezo actuator was calibrated using a collimated beam (i.e., without the 300 mm lens) using the apparatus in the standard configuration, thus for the measurement of θ with very large R. It has been found that the piezo actuator introduces an angular deviation of 7.2 μrad when 10V is applied to the 800 Hz frequency. This frequency was chosen to avoid all the piezo mounting resonances and the noise due to air fluctuations present at lower frequencies.

The experimentation is based on the comparison between the expected shift, based on the apparatus arrangement, and the shift measured (or, calculated on the basis of the angular inclination measurement).

The expected shift is equal to the distance between the mirror connected to the piezo actuator and the focal point (z0) multiplied by the angular deviation produced by the piezo actuator, and multiplied by a factor 0.97 (suitable to correct the contribution due to the fact that the mirror not only rotates but also translates at the point of incidence).

The measured shift is given by the product between the distance between the focus point and the first slit of the device (which in the specific case is equal to the radius of curvature) and the angular deviation measured by the apparatus, i.e., $\theta_m \ast R$.

To obtain the experimental values of z0 and R a camera was used and the size of the spot was measured at different distances between the mirror and the apparatus.

Figure 17:
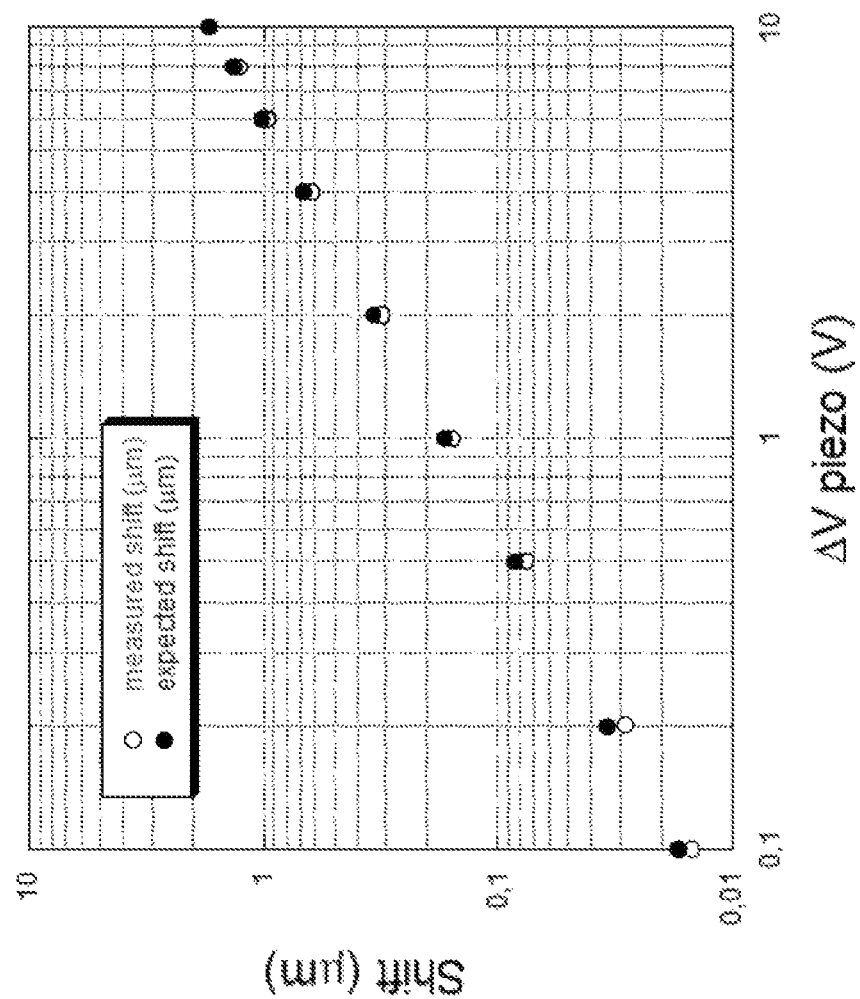
FIG. 17 shows an experimental comparison between expected values of the spatial shift of a focused laser beam and corresponding values measured by means of an embodiment of the spatial shift measurement method of a focused laser beam according to the present invention.

FIG. 17 shows the comparison between the expected shift and the shift measured as a function of the voltage applied to the piezo actuator. The voltage refers to the peak-to-peak amplitude of the sinusoid applied to the piezo actuator at a frequency of 800 Hz. As can be seen from the figure, the measured shift values (i.e., obtained by the present method) are very similar to the values of the expected shift, which provides confirmation of the validity of the method.

From FIG. 17, it can be also noted that the spatial shift values measurable by the present method can also be very small, up to the order of nanometers.

Also for the spatial shift measurement method, the frequency domain analysis techniques (for example, by operating an FFT of the signal in the time domain at the output of the device), previously illustrated with reference to the spatial inclination measurement method, can be applied.

In a method of measuring the spatial shift in the focus, the result depends on the local value of the curvature of the laser spot. In the case of a simple Gaussian beam this curvature is equal to the radius of curvature everywhere, but in the case of low quality laser spots the direction of the radius vector can undergo more or less large deviations with respect to the ideal case. Therefore it is important to check the reliability of the method according to the quality of the laser beam.

Conventionally the spatial quality factor of a laser beam is defined by parameter $M^2$. In the ideal case $M^2$ is 1 while for inferior spatial quality we always have $M^2 > 1$.

For the validation of the method with respect to this aspect, the $M^2$ parameter was measured following the procedure defined by the ISO11146 standard: by means of a CCD, the beam size was taken in three zones, before the focal point, near the focal point and after the focal point. The two positions before and after the focal point were placed at a distance from the focus of about 10 times the Rayleigh range (which, in the specific experimental case, is about 26 mm).

In particular, the beam size is defined as follows:

$$\sigma_x^2 = \frac{\int dxdy I(x,y)(x^2 - \bar{x}^2)}{\int dxdy I(x,y)}$$

where $\sigma^2$ is the variance of the intensity distribution $I(x,y)$ measured by the CCD.

The average value of x is calculated on the basis of the same distribution:

$$\bar{x} = \frac{\int dxdy I(x,y)x}{\int dxdy I(x,y)}$$

In order to obtain a reliable measurement it is important to eliminate the background from the $I(x,y)$ distribution to avoid obtaining overestimated variance values. The same definition was used for the measurement of the same quantities along the y direction.

To obtain the value of $M^2$ the obtained dimension values, as a function of the longitudinal position of the CCD, are adapted on the basis of the following equation:

$$w_x^2(z) = w_{x0}^2 + \left(\frac{M^2 \lambda}{\pi w_{x0}}\right)^2 (z - z0)^2$$

where $w_{x0}$ is the spot dimension at the focal point, and the relation $w_x = 2\sigma_x$ applies, as z0 is the focal point position.

Moreover, the experimental arrangement allowed to change in a controlled and desired way the value of $M^2$ by acting on the dimension and also on the positioning of the iris that is located in the laser cavity. In fact, by enlarging this iris, more spatial modes of the laser cavity are activated and therefore a beam with less spatial quality is obtained. In fact, the square of the $M^2$ parameter is approximately equal to the number of spatial modes generated.

It should also be noted that, with the experimental apparatus used, one can obtain values of $M^2$ approximately equal along x and y.

After measuring $M^2$, six shift measurements were made by positioning the device in such a way that different parts of the laser spot passes through the first slit. In this way, a sample of measurements was obtained relative to different values of the local curvature radius of the spot. The more this value deviates from the ideal case, the more a significant discrepancy is expected with respect to the expected shift value.

Figure 18:
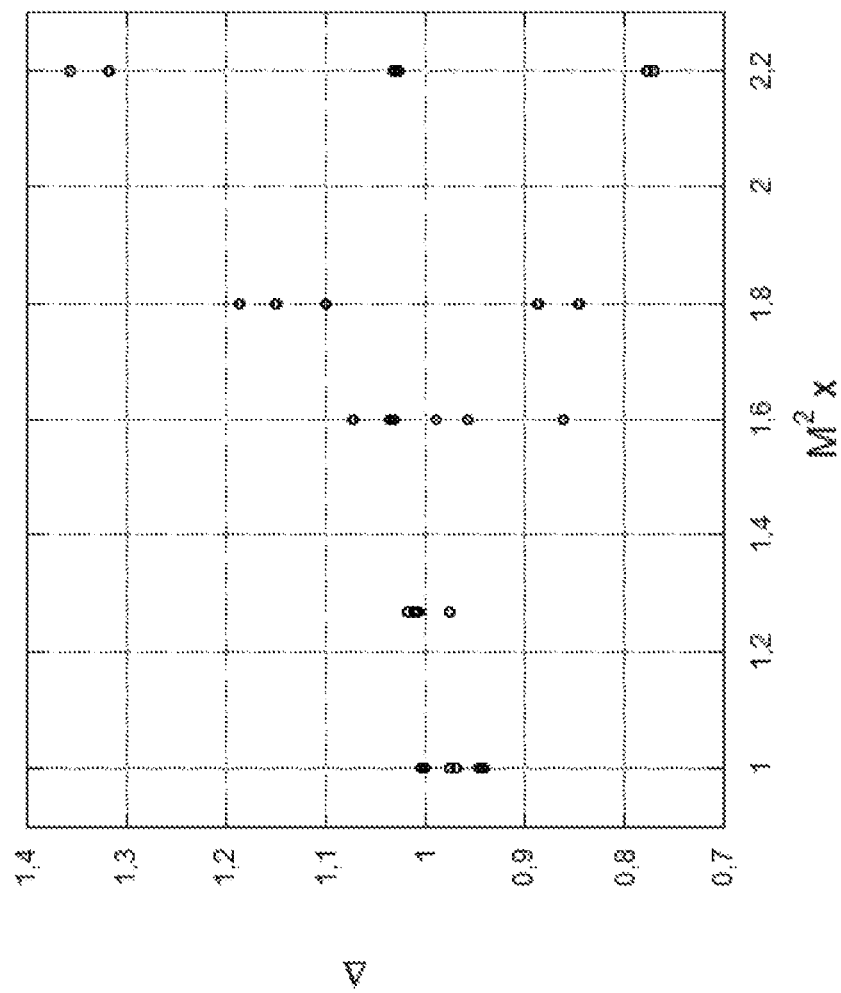
FIG. 18 illustrates an experimental comparison between expected values of the spatial shift of a focused laser beam and corresponding values measured by the spatial shift measurement method of a focused laser beam, as a spatial quality parameter of the laser beam varies.

FIG. 18 shows the results for five different $M^2$ values. In particular, on the ordinates of the graph the value shift defined as the ratio between the measured shift and the expected shift is reported, as a function of different values of $M^2$ reported in the abscissa.

As can be seen in FIG. 18, for values of $M^2$ greater than 1.5 the value of $\Delta$ increases.

Based on the results shown in FIG. 18, it can be concluded that for values of $\Delta$ less than 1.5 the shift method is reliable even on the single measurement (i.e., with a single positioning of the device).

For $M^2$ values greater than 1.5, on the other hand, the measurement becomes reliable if the average value obtained by taking measurements at different spots of the spot is taken. In fact, it can be noted that the variance of the measurements increases while increasing $M^2$ but the average value remains constant.

As can be seen, the object of the present invention is fully achieved by the device and by the method for measuring an angular inclination and angular inclination fluctuations of an electromagnetic radiation beam, by virtue of the structural and functional characteristics described above.

In fact, the device and the method of the invention make it possible to measure angular fluctuations of high frequency beams, i.e., at frequencies up to the order of magnitude of the MHz. Furthermore, by obtaining the spectrum of the measured angular fluctuations, it is possible to identify the angular fluctuation for each frequency.

Moreover, the device and the method of the invention allow high-resolution angular inclination measurements, i.e., with resolution up to the order of magnitude of the nanoradiant, while ensuring high reliability, i.e., measurement errors below the 10%.

A further advantage of the present invention is the possibility of carrying out high quality measurements, such as those illustrated above, by means of simple, compact and robust devices. In particular, the dimensions of the measuring instrumentation are reduced by a significant factor (up to a factor of 100) with respect to the lengths of the measurement configurations provided for in the known solutions.

Furthermore, the device according to the invention allows to solve the problem of attenuation of high intensity beams, in the sense that the device itself, due to its intrinsic functioning, attenuates the beam by some orders before it reaches the detector.

In addition, the method according to the invention enables the beam pointing stability to be measured based on the detection and storage of a very small amount of data (with respect to the amount of data required in traditional procedures).

The aforementioned advantages are achieved thanks to the use of two slits and two photodiodes instead of a "lens+camera" system as in the known solutions, that is by virtue of the adoption of an electromechanical and non-optical approach, which is completely new in the specific technical area considered.

This choice allows to provide a much more compact, precise and sensitive instrument, modeled by a clear physics, which shows how the system responds linearly to the angular deviations of the beam.

If the device is to be used at a point where the beam is particularly intense (for example, greater than 100 mJ/cm$^2$), it is possible to simply attenuate the beam by a neutral filter.

The dynamic operating range of the instrument is extremely high, sufficient to cover all the cases present in current installations.

Furthermore, based on some tests that have been carried out, the device works well both in air and in vacuum.

The applications of the device and the method for the measurement of an angular inclination and of angular inclination fluctuations of the beam, illustrated above, are manifold.

The main area of application is laser metrology, in all its technological and scientific applications, particularly where a high-precision measurement of the angular stability of a laser beam is required (especially for high stability values, with fluctuations of below 0.5 μrad).

Moreover, advantageously, the use of a plurality of measurement devices can be envisaged, such as a diagnostic network for pointing stability with a high repetition rate, to achieve active stabilization and alignment for the laser line.

A further possible application, aimed at the functional improvement of a laser system, is the use of the device in a procedure for correcting the time internal jitter in the laser, caused in part by the stability of the assembly along the line.

Other possible fields of application of the illustrated solution are the measurement of the stability of beams of non-laser electromagnetic radiation, for example, of an X-ray beam at the exit from an X-FEL (X-ray Free Electron Laser), using photodiodes for X-rays and a suitable slit material.

In addition to the above, thanks to the fact that in the present solution the laser beam is selected from the slit, the diffraction pattern which is formed on the plane of the second slit is independent from the size of the original beam. This gives the module a great flexibility, since the measurement is independent of the beam size, and does not require adapting the beam to the instrument, as it is necessary to do with the known techniques.

Consequently, this advantageously allows to quickly position the instrument in different areas of the laser system to test the angular noise.

There are also numerous applications of the system and the method for determining the stability and/or vibration state of a mechanical structure (based on the aforementioned device) illustrated above.

For example, an important application is the measurement of the mechanical stability of buildings, of assembly, of mechanical structures in general, in order to identify weak points. This can be done by measuring the spectrum of fluctuations, identifying the frequency of the fluctuation (indicative of instability) and comparing it with the typical known vibration frequencies of the various parts of the structure, to identify the origin of the fluctuation and therefore the unstable part.

Another application concerns the measurement and stabilization of the length of a resonant cavity.

A further application concerns the high-precision measurement of the stability of objects that have very high stability requirements, for example interferometer mirrors for gravitational wave detectors, to measure the angular noise caused by such mirrors, so as to characterize the background noise on the measurement of gravitational waves.

Another important application of the angular inclination measurement method is the use of this method as the basis for a method of measuring a spatial shift of a focused laser beam (as described above).

The ability to effectively carry out this measurement of a spatial shift of a focused laser beam is particularly useful and important, for example, in the case of laser systems used for plasma acceleration. In these systems a laser beam is focused on a target and it is essential to know the spatial fluctuation of the laser on the target.

To the embodiments of the device and of the method for measuring an angular inclination and of angular inclination fluctuations of the beam, and of the system and method for determining the stability and/or the state of vibration of a mechanical structure, illustrated above, a person skilled in the art, in order to satisfy contingent needs, may make modifications, adaptations and replacements of elements with others functionally equivalent, without departing from the scope of the following claims.

Each of the characteristics described as belonging to a possible embodiment can be implemented independently of the other embodiments described. Note also that the term "comprising" does not exclude other elements or phases, the term "a" or "one" does not exclude a plurality.

The invention claimed is:

1. A device for measuring an angular inclination and angular inclination fluctuations of an electromagnetic radiation beam, the device being able to detect the incidence angular inclination and the fluctuations thereof with respect to a nominal beam propagation axis, in a desired detection plane comprising the nominal propagation axis, wherein the device comprises:
- a first screen, comprising a first slit having a first slit dimension along a first direction on a detection plane transverse to the first slit, said first slit being adapted to determine, when crossed by the beam, a diffraction of the beam, so as to generate downstream of the first screen, a diffracted electromagnetic field having on said detection plane a diffraction pattern dependent on said incidence angular inclination of the beam;
- a second screen, comprising a second slit having a second slit dimension along a second direction parallel to said first direction on said detection plane, said second slit being parallel to the first slit in a direction perpendicular to said first direction and second direction, and being arranged in a selection position on a scale defined on said second direction,
- said second screen being arranged downstream of the first screen, with respect to the propagation of the beam, and being configured to shield the diffracted electromagnetic field with the exception of a transmitted portion of diffracted electromagnetic field passing through said second slit;
- at least one first electromagnetic power and/or energy detector, arranged downstream of the second slit with respect to the propagation of the beam, and configured to detect the power and/or electromagnetic energy of said transmitted portion of diffracted electromagnetic field, dependent on said diffraction pattern;
- said at least one first electromagnetic power and/or energy detector being configured to generate a first electrical signal, based on the detected electromagnetic power and/or energy, said first electric signal being representative of said incidence angular inclination of the beam in the detection plan.

2. The device according to claim 1, wherein said selection position of the second slit is displaced at a shift distance, along the second direction, with respect to a position of alignment of the second slit with the first slit defined with respect to the nominal propagation axis of the beam.

3. The device according to claim 2, wherein said first screen and second screen are parallel to each other and arranged at a distance between screens along a direction parallel to the nominal propagation axis of the beam,
and wherein said shift distance is defined depending on said first slit dimension and said distance between screens, so that the predefined power and/or energy curve of the diffraction figure of the diffracted electromagnetic field, as a function of the second direction, in conditions of incident beam aligned with the nominal propagation axis, has a maximum derivative value, and therefore a maximum value of sensitivity to the displacement of the diffraction pattern as a consequence of a variation of incidence angular inclination.

4. The device according to claim 1, wherein said first slit dimension is defined so that the incident beam is spatially coherent in the window defined by said slit dimension along the first direction,
or wherein the device further comprises:
- a beam splitter, arranged downstream of the first screen and configured to divide the electromagnetic radiation beam into a first beam portion, which continues towards the second screen, and a second beam portion, which is deflected in a different direction;
- a second electromagnetic power and/or energy detector, arranged in such a way to receive said second deflected beam portion, and configured to detect the electromagnetic power and/or energy of said second deflected beam portion;

said second electromagnetic power and/or energy detector being configured to generate a second electrical signal, based on the detected electromagnetic power and/or energy, said second electrical signal being representative of the power and/or energy of the incident electromagnetic radiation beam.

5. The device according to claim 1, wherein:
the electromagnetic radiation beam is a laser beam at a frequency belonging to an infrared or visible or ultraviolet detectable frequency range, and wherein:
said first screen and second screen are made of opaque material with respect to the frequencies of said range of detectable laser beam frequencies;
said first detector and/or said second electromagnetic power and/or energy detector comprises a photodiode configured to detect electromagnetic power and/or energy at the frequencies of said laser beam frequency range detectable,
or
the electromagnetic radiation beam is an X-ray beam, at a frequency belonging to a range of frequencies in the X-ray band, and wherein:
said first screen and second screen are made of opaque material with respect to the frequencies of said frequency range in the band of detectable X-rays;
said first detector and/or said second electromagnetic power and/or energy detector comprises an X-ray detector configured to detect electromagnetic power and/or energy at the frequencies of said frequency range in the X-ray band detectable.

6. The device according to claim 1, wherein the device further comprises:
first means for controlled screen moving, configured to move in a controlled manner the second screen with respect to the first screen, along said second direction, to controllably vary said shift distance of the second slit;
and/or second means for controlled screen moving, configured to move in a controlled manner the second screen with respect to the first screen, along said direction parallel to the nominal propagation axis of the beam, so as to vary in controllable way said distance between screens;
and/or slit opening control means, configured to controllably vary said first slit dimension of the first slit;
or
wherein the device further comprises:
a first frequency filter, located just upstream of the first electromagnetic power and/or energy detector, and configured to filter the electromagnetic field incident on said first detector in frequency within a predefined frequency range;
and/or a second frequency filter, located just upstream of the second electromagnetic power and/or energy detector, and configured to filter the electromagnetic field incident on said second detector in frequency within a predefined frequency range.

7. The device according to claim 1, configured to determine fluctuations on a first detection plane and on a second detection plane, mutually perpendicular,
wherein the device further comprises a beam splitter, downstream of the first screen and upstream of the second screen, configured to divide the beam into two parts;

wherein a bi-dimensional opening is formed in the first screen, through which the incident beam passes, and wherein two slits are formed in the second screen: one slit perpendicular to the first detection plane and one slit perpendicular to the second detection plane, wherein the fluctuations with respect to the first detection plane are detected by the first divided beam portion directed towards the slit perpendicular to the first detection plane, and the fluctuations with respect to the second detection plane are detected by the second divided beam portion directed towards the slit perpendicular to the second detection plane.

8. A system for the measurement of angular inclination and angular inclination fluctuations of an electromagnetic radiation beam, comprising:

a device for measuring an angular inclination and angular inclination fluctuations of an electromagnetic radiation beam according to claim 1;

a processor operatively connected to the device to receive said first electric signal indicative of the detected electromagnetic power and/or energy, and configured to determine said incidence angular inclination of the beam in the detection plane and/or said fluctuations of the incidence angular inclination based on the said first electrical signal.

9. A system for the measurement of angular inclination and angular inclination fluctuations of an electromagnetic radiation beam, comprising:

the device according to claim 4;

a processor operatively connected to the device to receive said first electric signal indicative of the detected electromagnetic power and/or energy, and configured to determine said incidence angular inclination of the beam in the detection plane and/or said fluctuations of the incidence angular inclination based on the said first electrical signal;

wherein the processor is operatively connected to the device to also receive said second signal electrical representative of the power and/or energy of the incident electromagnetic radiation beam, the processor being further configured to determine said incidence angular inclination of the beam in the detection plane and/or said fluctuations of the incidence angular inclination based on said first electric signal and of said second electrical signal, so that the determination of the incidence angular inclination is independent of variations in power and/or energy of the incident beam.

10. The system according to claim 8, wherein the processor is further configured to display the time course of the incidence angular inclination of the beam, and/or the processor is further configured to calculate the Fourier transform of the fluctuations of the angular inclination of the beam and to display the frequency spectrum of said fluctuations of the angular inclination.

11. The system according to claim 8, wherein the device is configured so that:

said selection position of the second slit is displaced at a shift distance, along the second direction, with respect to a position of alignment of the second slit with the first slit defined with respect to the nominal propagation axis of the beam;

said first screen and second screen are parallel to each other and arranged at a distance between screens along a direction parallel to the nominal propagation axis of the beam;

said shift distance is defined depending on said first slit dimension and said distance between screens, so that the predefined power and/or energy curve of the diffraction figure of the diffracted electromagnetic field, as a function of the second direction, in conditions of incident beam aligned with the nominal propagation axis, has a maximum derivative value, and therefore a maximum value of sensitivity to the displacement of the diffraction pattern as a consequence of a variation of incidence angular inclination.

12. A method for measuring an angular inclination and angular inclination fluctuations of an electromagnetic radiation beam, with respect to a nominal beam propagation axis, in a desired detection plane comprising the nominal propagation axis, wherein the method includes the steps of:

passing the electromagnetic radiation beam through a first slit of a first screen, said first slit being arranged transversely with respect to the detection plane and having a first slit dimension along a first direction on said detection plane, so as to cause a diffraction of the beam and generate, downstream of the first screen, a diffracted electromagnetic field having on said detection plane a diffraction pattern dependent on said incidence angular inclination of the beam;

arranging, downstream of the first screen with respect to the propagation of the beam, a second screen, comprising a second slit having a second slit dimension along a second direction parallel to said first direction on the detection plan, wherein the step of arranging comprises arranging the second screen so that said second slit is parallel to the first slit in a direction perpendicular to said first direction and second direction, and placed in a selection position on a scale defined on said second direction;

shielding, by said second screen, the diffracted electromagnetic field except for a transmitted portion of diffracted electromagnetic field, passing through said second slit;

detecting the power and/or electromagnetic energy of said transmitted portion of diffracted electromagnetic field, dependent on said diffraction pattern, by at least a first electromagnetic power and/or energy detector, located downstream of the second slit with respect to beam propagation;

generating, based on the detected electromagnetic power and/or energy, a first electrical signal representative of said incidence angular inclination of the beam in the detection plane;

measuring the angular inclination and the angular inclination fluctuations of the electromagnetic radiation beam based on said first electrical signal.

13. The method according to claim 12, wherein the step of arranging further comprises arranging the second slit so that said selection position of the second slit is displaced at a shift distance, along the second direction, with respect to an alignment position of the second slit relative to the first slit defined with respect to the nominal propagation axis of the beam;

wherein the step of arranging further comprises:

arranging said first screen and second screen parallel to each other and at a distance between screens along a direction parallel to the nominal propagation axis of the beam;

arranging the second slit so as to define an optimum shift distance, depending on said first slit dimension and said distance between screens;

said optimum shift distance being such that the predefined power and/or energy curve of the diffracted electromagnetic field diffraction pattern, as a function of the second direction, in conditions of incident beam aligned to the nominal propagation axis, has a maximum derivative value, and therefore a maximum value of sensitivity to the diffraction pattern displacement as a consequence of a variation of the incidence angular inclination.

14. The method according to claim 12, further comprising a step of defining said first slit dimension based on the wavelength of the incident beam so that the incident beam is spatially coherent in the window defined by said slit dimension along the first direction; or wherein the step of arranging further comprises:
placing the first screen and/or the first slit, with respect to the source of the electromagnetic beam, in such a way that the spatial offset of incidence of the beam on the first slit, due to an incidence angular inclination, within a range of detectable inclinations, is much less than the curvature radius of the incident beam at the first slit;
or
the method further comprises the steps of:
dividing, downstream of the first screen, the electromagnetic radiation beam into a first beam portion, which continues towards the second screen, and a second beam portion, which is deflected in a different direction;
receiving said second deflected beam portion, and detecting the electromagnetic power and/or energy of said second deflected beam portion, by a second electromagnetic power and/or energy detector;
generating, based on the detected electromagnetic power and/or energy of the second beam portion, a second electrical signal representative of the power and/or energy of the incident electromagnetic radiation beam;
measuring the angular inclination and the angular inclination fluctuations of the electromagnetic radiation beam based on said first electrical signal and second electrical signal;
or
wherein the electromagnetic radiation beam is a laser beam at a frequency belonging to an infrared or visible or ultraviolet detectable frequency range, or wherein the electromagnetic radiation beam is an X-ray beam, at a frequency belonging to a range of frequencies in the X-ray band.

15. A system for determining the stability and/or the vibration state of a mechanical structure, comprising:
a laser beam source, configured to be optically coupled to said mechanical structure, so as to determine a detection laser beam, wherein a movement and/or vibrations of the mechanical structure cause fluctuations of an incidence angle of the detection laser beam;
a system for measuring an angular inclination and angular inclination fluctuations of an electromagnetic radiation beam, according to claim 8, arranged so as to receive the detection laser beam and determine the angular inclination fluctuations of said detection laser beam;
wherein the processor is further configured to determine the stability and/or the vibration state of the mechanical structure based on the determined fluctuations of the angular inclination of the received laser detection beam.

16. The system according to claim 15, wherein the laser beam source is configured to be stably and integrally fixed to said mechanical structure, so that a movement and/or vibrations of this mechanical structure cause fluctuations of the laser beam emission angle, and wherein the detection laser beam coincides with the laser beam emitted by the laser source.

17. The system according to claim 16, configured to determine the stability and/or the vibration state of a mechanical structure comprising a reflecting stably and integrally fixed to the mechanical structure;
wherein the laser beam source is configured to send the emitted laser beam onto said reflecting surface, and wherein said detection laser beam coincides with the laser beam reflected by the reflecting surface, determined by the reflection of said laser beam emitted by the laser source and incident on the reflective surface;
and wherein the system for measuring an angular inclination and angular inclination fluctuations of an electromagnetic radiation beam is configured to receive said laser beam reflected by the aforementioned reflecting surface and to measure the angular inclination;
wherein the angular inclination of the received reflected beam, and the fluctuations thereof, are indicative of movements and/or vibrations of the reflecting surface, which are in turn representative of corresponding movements/vibrations of the mechanical structure.

18. A method for determining the stability and/or the vibration state of a mechanical structure, wherein the method comprises:
integrally fixing a laser beam source to said mechanical structure, so that a movement and/or vibrations of the mechanical structure cause fluctuations in the emission angle of the laser beam;
emitting a laser beam from said laser beam source;
determining angular inclination fluctuations of said emitted laser beam, by carrying out a method for measuring an angular inclination and angular inclination fluctuations of an electromagnetic radiation beam, in accordance with claim 12;
determining the stability and/or the vibration state of the mechanical structure based on the determined fluctuations of the angular inclination of the laser beam incidence; or wherein the method comprises:
integrally fixing a reflective surface to said mechanical structure, so that movements and/or fluctuations of the mechanical structure determine corresponding movements and/or fluctuations of the reflecting surface;
emitting a laser beam from said laser beam source, and directing said emitted laser beam onto said reflecting surface, to generate a corresponding laser beam reflected by the reflecting surface;
determining angular inclination fluctuations of said reflected laser beam, by a method for measuring an angular inclination and angular inclination fluctuations of an electromagnetic radiation beam, according to claim 12;
determining the stability and/or vibration state of the mechanical structure based on the determined fluctuations of the angular inclination of the reflected laser beam.

19. A method for measuring a spatial shift of a focused laser beam, at the focus point, with respect to an optical reference axis, comprising the steps of:
measuring the incidence angular inclination of the laser beam, with respect to the nominal propagation axis of the beam, by a method for measuring an angular inclination of an electromagnetic radiation beam according to claim 12, carried out by a device for measuring an angular inclination and angular inclination fluctuations of an electromagnetic radiation beam, the device being able to detect the incidence angular inclination and the fluctuations thereof with respect to a nominal beam propagation axis, in a desired detection plane comprising the nominal propagation axis, wherein the device comprises:

- a first screen, comprising a first slit having a first slit dimension along a first direction on a detection plane transverse to the first slit, said first slit being adapted to determine, when crossed by the beam, a diffraction of the beam, so as to generate downstream of the first screen, a diffracted electromagnetic field having on said detection plane a diffraction pattern dependent on said incidence angular inclination of the beam;
- a second screen, comprising a second slit having a second slit dimension along a second direction parallel to said first direction on said detection plane, said second slit being parallel to the first slit in a direction perpendicular to said first direction and second direction, and being arranged in a selection position on a scale defined on said second direction,
- said second screen being arranged downstream of the first screen, with respect to the propagation of the beam, and being configured to shield the diffracted electromagnetic field with the exception of a transmitted portion of diffracted electromagnetic field passing through said second slit;
- at least one first electromagnetic power and/or energy detector, arranged downstream of the second slit with respect to the propagation of the beam, and configured to detect the power and/or electromagnetic energy of said transmitted portion of diffracted electromagnetic field, dependent on said diffraction pattern;
- said at least one first electromagnetic power and/or energy detector being configured to generate a first electrical signal, based on the detected electromagnetic power and/or energy, said first electric signal being representative of said incidence angular inclination of the beam in the detection plan
- wherein said device is arranged so that said optical reference axis coincides with the nominal propagation axis of the beam, and said first slit of the device is arranged at a predefined distance from the focus point;
- calculating the spatial shift of the focusing point of the laser beam with respect to the optical axis based on the angular inclination of measured incidence.

20. A method for measuring a spatial shift of a focused laser beam, according to claim 19, wherein said predefined distance is substantially equal to the curvature radius of the laser beam; and wherein said phase of calculating the spatial deviation includes calculating the spatial deviation based on the equation:

$$\theta_m = -\frac{s}{R}.$$

* * * * *